(12) United States Patent
Harutyunyan et al.

(10) Patent No.: US 11,165,067 B2
(45) Date of Patent: Nov. 2, 2021

(54) POROUS CURRENT COLLECTOR AND ELECTRODE FOR AN ELECTROCHEMICAL BATTERY

(71) Applicant: HONDA MOTOR CO., LTD., Tokyo (JP)

(72) Inventors: Avetik Harutyunyan, Columbus, OH (US); Gugang Chen, Powell, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 172 days.

(21) Appl. No.: 15/442,442

(22) Filed: Feb. 24, 2017

(65) Prior Publication Data

US 2017/0263938 A1    Sep. 14, 2017

Related U.S. Application Data

(60) Provisional application No. 62/307,328, filed on Mar. 11, 2016.

(51) Int. Cl.
| | | |
|---|---|---|
| *H01M 4/80* | (2006.01) | |
| *H01M 4/134* | (2010.01) | |
| *H01M 4/62* | (2006.01) | |
| *H01M 4/66* | (2006.01) | |
| *H01M 10/0525* | (2010.01) | |

(52) U.S. Cl.
CPC ............ *H01M 4/80* (2013.01); *H01M 4/134* (2013.01); *H01M 4/625* (2013.01); *H01M 4/661* (2013.01); *H01M 4/663* (2013.01); *H01M 4/667* (2013.01); *H01M 10/0525* (2013.01)

(58) Field of Classification Search
CPC ..................................................... H01M 4/80
See application file for complete search history.

(56) References Cited

U.S. PATENT DOCUMENTS

| | | |
|---|---|---|
| 6,238,819 B1 | 5/2001 | Cahill et al. |
| 7,183,018 B2 | 2/2007 | Kawakami et al. |
| 7,811,705 B2 | 10/2010 | Scott et al. |
| 8,119,288 B2 | 2/2012 | Zhamu et al. |
| 8,277,974 B2 | 10/2012 | Kumar et al. |
| 8,389,157 B2 | 3/2013 | Frank et al. |
| 8,465,875 B2 | 6/2013 | Hosoe |
| 8,580,432 B2 | 11/2013 | Zhamu et al. |

(Continued)

FOREIGN PATENT DOCUMENTS

| | | |
|---|---|---|
| CN | 1988223 A | 6/2007 |
| CN | 103794791 A | 5/2014 |

(Continued)

OTHER PUBLICATIONS

Definitions U.S. Appl. No. 15/442,442 (Year: 2020).*

(Continued)

*Primary Examiner* — Brian R Ohara
(74) *Attorney, Agent, or Firm* — Arent Fox LLP

(57) ABSTRACT

A component for use in an electrochemical battery, wherein the component includes a self-supporting porous metal substrate capable of acting as both an electrode and a current collector in an electrochemical battery. The present disclosure is also directed to methods of making the components of the present disclosure and electrochemical batteries including at least one component according to the present disclosure.

18 Claims, 23 Drawing Sheets

(56) References Cited

U.S. PATENT DOCUMENTS

| | | | |
|---|---|---|---|
| 2003/0143440 A1* | 7/2003 | Tao | H01M 8/04186 429/444 |
| 2005/0084739 A1* | 4/2005 | Swider-Lyons | H01M 4/8605 429/419 |
| 2005/0175901 A1 | 8/2005 | Kawakami et al. | |
| 2005/0238956 A1 | 10/2005 | Lee | |
| 2006/0029860 A1* | 2/2006 | Ketcham | H01M 4/661 429/209 |
| 2006/0201801 A1* | 9/2006 | Bartlett | H01M 4/0438 204/284 |
| 2007/0202414 A1* | 8/2007 | Yoshida | H01M 4/5825 429/304 |
| 2007/0287068 A1 | 12/2007 | Shimizu et al. | |
| 2009/0087750 A1* | 4/2009 | Takita | H01M 2/1653 429/254 |
| 2009/0103242 A1* | 4/2009 | Buiel | H01M 12/005 361/502 |
| 2009/0186276 A1 | 7/2009 | Zhamu et al. | |
| 2010/0124700 A1 | 5/2010 | Schaefer et al. | |
| 2011/0114254 A1* | 5/2011 | Xu | H01M 4/0471 156/242 |
| 2012/0094142 A1 | 4/2012 | Hoshino et al. | |
| 2012/0115046 A2 | 5/2012 | Mak et al. | |
| 2013/0101907 A1* | 4/2013 | Takahashi | H01M 12/08 429/405 |
| 2013/0185930 A1* | 7/2013 | Teeters | H01M 4/0404 29/623.5 |
| 2013/0330611 A1 | 12/2013 | Chen et al. | |
| 2014/0004412 A1* | 1/2014 | Ogino | H01M 4/405 429/199 |
| 2014/0072871 A1 | 3/2014 | Chen et al. | |
| 2015/0093660 A1* | 4/2015 | Barde | H01M 4/0416 429/406 |
| 2018/0301696 A1* | 10/2018 | Barker | H01M 10/054 |

FOREIGN PATENT DOCUMENTS

| | | |
|---|---|---|
| CN | 104716330 A | 6/2015 |
| JP | 2015146226 A | 8/2015 |
| JP | 2017044693 A | 3/2017 |
| WO | WO 98/21767 A2 | 5/1998 |
| WO | WO 2014/094181 A1 | 6/2014 |

OTHER PUBLICATIONS

Shichao Zhang, A three-dimensional tin coated nanoporous copper for lithium-ion battery anodes, 2011, Journal of Power Sources, pp. 6915-6919 (Year: 2011).*

Notice of Reasons for Rejection issued by the Japanese Patent Office corresponding to Japanese Patent Application No. JP2017-044693, dated Feb. 22, 2021.

Chinese Office Action issued against related Chinese Application No. 201710146539.1 dated Feb. 26, 2021.

* cited by examiner

| Area | | |
|---|---|---|
| Single Point Surface Area at P/Po 0.19945424: | 4.0837 | m²/g |
| BET Surface Area: | 3.9844 | m²/g |
| Langmuir Surface Area: | 5.3314 | m²/g |
| BJH Adsorption Cumulative Surface Area of pores between 1.700000 and 300.000000 nm Diameter: | 1.4061 | m²/g |
| BJH Desorption Cumulative Surface Area of pores between 1.700000 and 300.000000 nm Diameter: | 1.5238 | m²/g |

| Volume | | |
|---|---|---|
| Single Point Adsorption Total Pore Volume of pores less than 73.2978 nm Diameter at P/Po 0.97286891: | 0.006734 | cm³/g |
| BJH Adsorption Cumulative Pore Volume of pores between 1.700000 and 300.000000 nm Diameter: | 0.009824 | cm³/g |
| BJH Desorption Cumulative Pore Volume of pores between 1.700000 and 300.000000 nm Diameter: | 0.009739 | cm³/g |

| Pore Size | | |
|---|---|---|
| Adsorption Average Pore Diameter (4V/A by BET): | 6.7602 | nm |
| BJH Adsorption Average Pore Diameter (4V/A): | 27.9462 | nm |
| BJH Desorption Average Pore Diameter (4V/A): | 25.5640 | nm |

Fig. 11a

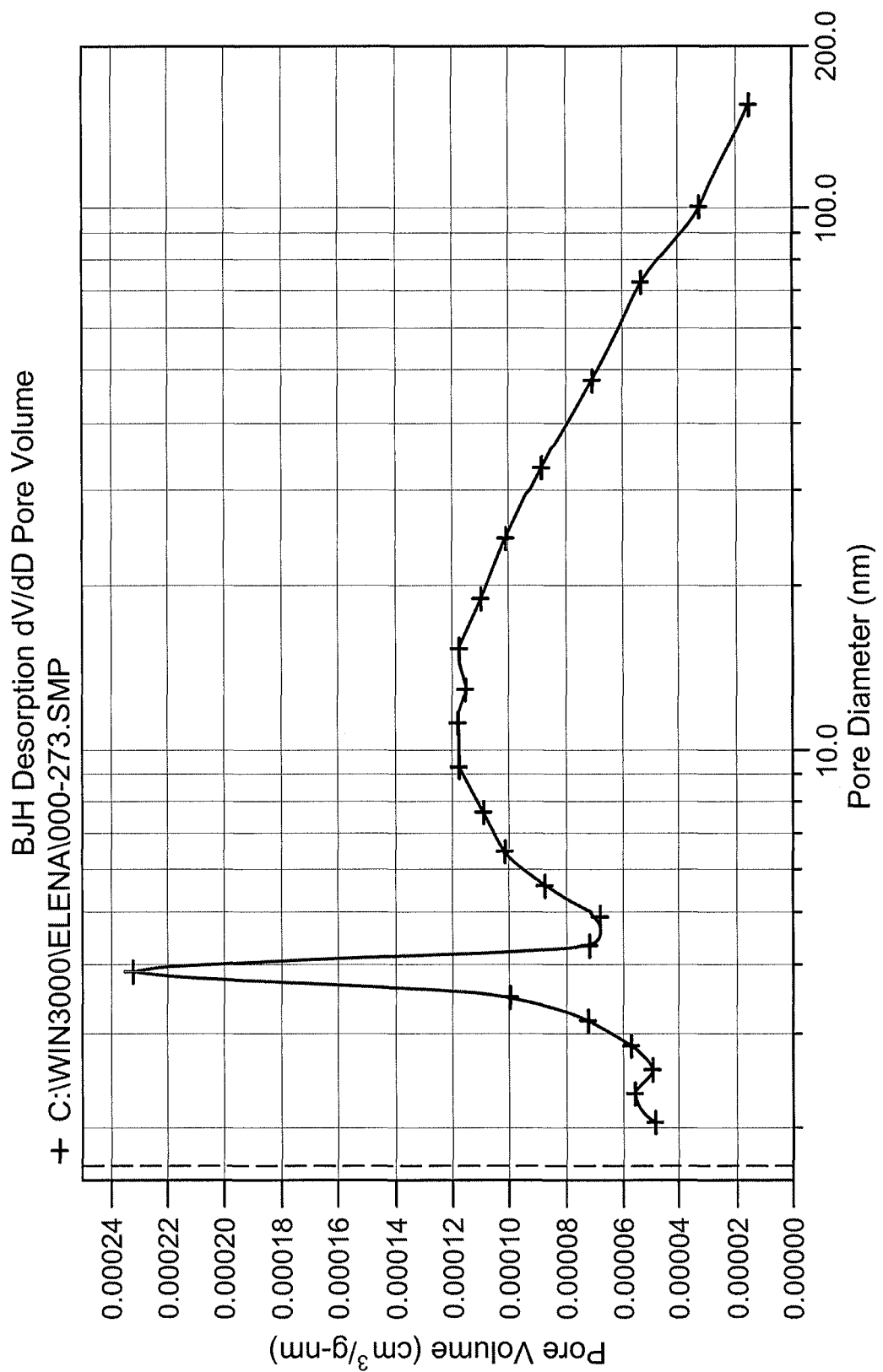

FIG. 13

Table 1    Nanoporous Cu capacity estimation

- Parameters of the nanoporous Cu electrode
  - Dimension: diameter D=1.4cm;
  - Electrode area: A=1.54cm²
  - Thickness: 700 nm
  - Pore size: ~ 50 nm
  - Porous Cu Layer Density: $\rho$=0.21mg/cm²

- Relationship between the electron charge units of "mAh" and "Coulomb":

$$1mAh = 10^{-3} A * 3600 \sec = 3.6 Coulomb \quad (1)$$

So, $\quad 1 Coulomb/cm^2 = \dfrac{1}{3.6} mAh/cm^2 = 0.278 mAh/cm^2 \quad (2)$

- Porous Cu Li storage capacity can be calculated to be:

$$C = \dfrac{Q(Coulombs/cm^2)}{\rho(mg/cm^2)} = \dfrac{Q(0.278mAh/cm^2)}{\rho(mg/cm^2)} \quad (3)$$

Therefore, $$C(Q=0.02) = \dfrac{0.02*0.278*1000}{0.21} mAh/g = 26 mAh/g \quad (4)$$

FIG. 14

Table 2

Microporous Cu capacity estimation

☐ Parameters of the microporous Cu electrode from MTI Corporation

- Dimension: diameter D=1.4cm;
- Electrode area: A=1.54cm$^2$
- Thickness: 1.6 mm
- Pore size: ~ 231 μm (= 110 pores per inch)
- Porous Cu Layer Density: ρ=350g/m$^2$=35mg/cm$^2$ Similarly, since microporous Cu has layer density: $\rho_{Graphite}$=35mg/cm$^2$, according to Eq. (3)

$$C(Q=0.16) = \frac{0.16*0.278*1000}{35} mAh/g = 1.3 mAh/g \quad (5)$$

FIG. 15
Table 3

Reference Graphite capacity estimation

Since Reference graphite has layer density: $\rho_{Graphite} = 2.86 mg/cm^2$, according to Eq. (3)

$$C(Q = 3.5) = \frac{3.5 * 0.278 * 1000}{2.86} mAh/g = 340 mAh/g \qquad (6)$$

POROUS CURRENT COLLECTOR AND ELECTRODE FOR AN ELECTROCHEMICAL BATTERY

CROSS-REFERENCE TO RELATED APPLICATIONS

This application claims the benefit of U.S. Provisional Patent Application No. 62/307,328, entitled "Porous Current Collector and Electrode for an Electrochemical Battery," filed on Mar. 11, 2016, which is expressly incorporated by reference herein in its entirety.

FIELD OF THE DISCLOSURE

This disclosure relates to electrochemical batteries, more particularly to electrodes and current collectors for use in electrochemical batteries.

BACKGROUND

Over the past several decades, electrochemical batteries such as lithium ion batteries (LIBs) have proven to be an exceptionally attractive energy source, particularly in consumer electronics, due at least partly to their high energy density, long cycle life, and lightweight, compact structure. Electrochemical batteries, a type of rechargeable battery capable of being charged, discharged, and recharged many times, utilize a negative electrode (e.g., an anode), a positive electrode (e.g., a cathode), and an electrolyte (e.g., a conductive medium). While it is understood that the terms "anode" and "cathode" apply to each of the negative and positive electrodes depending upon whether the cell is being charged or is discharging, hereinafter the term "anode" is used to refer to the negative electrode, and the term "cathode" is used to refer to the positive electrode. During use, ions (for example, lithium ions in the case of an LIB) move from the anode to the cathode via the electrolyte during discharge, and from the cathode to the anode when charging. Generally, electrochemical batteries also comprise current collectors on the external faces of the electrodes in order to collect the charge generated by the battery during discharge, and to permit connection to an external power source during the recharging of the electrochemical battery. For example, many electrochemical batteries comprise a metal current collector bound to each electrode which gathers electrons, and moves them to an external circuit.

Among materials suitable for anode construction, graphite has emerged as a popular choice due at least partly to its defined layered structure for ion (e.g., lithium) insertion (i.e., intercalation), low operating potential, and good interfacial stability. However, in the case of LIBs, the maximum amount of lithium that can be intercalated within the graphite is one per six carbon atoms. As such, the specific capacity of graphite is limited to 372 Ah/kg, as any attempt to intercalate more lithium leads to the formation of lithium metal clusters followed by dendrite formation.

It has been found that "hard carbon" (i.e., disordered carbonaceous materials wherein the carbon atoms are generally arranged in a planar hexagonal network without crystallographic order, and wherein the carbon layers are generally immobilized by crosslinking) demonstrates a higher capacity (around 450 Ah/kg).

As such, there is a need in the art for improved electrochemical batteries, particularly improved electrochemical battery electrode material.

SUMMARY

Although an explanation for the higher capacity of hard carbon has not been conclusively determined, it is possible that the pore size and distribution of hard carbon at least plays a role. However, despite its relatively higher capacity, hard carbon disadvantageously exhibits low density, incompatibility with current anode coating technologies, larger irreversible capacity, and hysteresis in the voltage profile.

The present disclosure is generally directed to a component for use in an electrochemical battery, wherein the component includes a self-supporting porous metal substrate capable of acting as both an electrode and a current collector in an electrochemical battery. Optionally, the pores of the metal substrate may be tailored to have the same diameter or other characteristics of a hard carbon material. While the present disclosure will be described in terms of an LIB, it should be understood that any rechargeable electrochemical battery capable of performing according to the present disclosure may be used. Example electrochemical batteries that may be used according to certain aspects of the present disclosure include lithium-sulphur, sodium ion, and lead acid batteries, among others.

According to some aspects, the porous metal substrate may be electrically conductive. According to some aspects, the porous metal substrate may comprise a plurality of pores with a particular pore size and/or distribution capable of ion intercalation and release. Optionally, the pore size and/or distribution may be tailored to be the same as that of a hard carbon material. The present disclosure is also directed to methods of making the components of the present disclosure and electrochemical batteries including at least one component according to the present disclosure.

BRIEF DESCRIPTION OF THE DRAWINGS

FIGS. 11a, 11b, 11c, and 11d show the results of Brunauer-Emmett-Teller (BET) surface area measurements corresponding to an example hard carbon material according to the present disclosure.

FIG. 13 illustrates how the capacity was estimated for the coin cell battery construction including the nanoporous copper electrode shown in FIG. 8.

FIG. 14 illustrates how the capacity was estimated for the coin cell battery construction including the microporous copper electrode shown in FIG. 5.

FIG. 15 illustrates how the capacity was estimated for the coin cell battery construction including a reference electrode as shown in FIG. 3.

DETAILED DESCRIPTION

Figure 1:
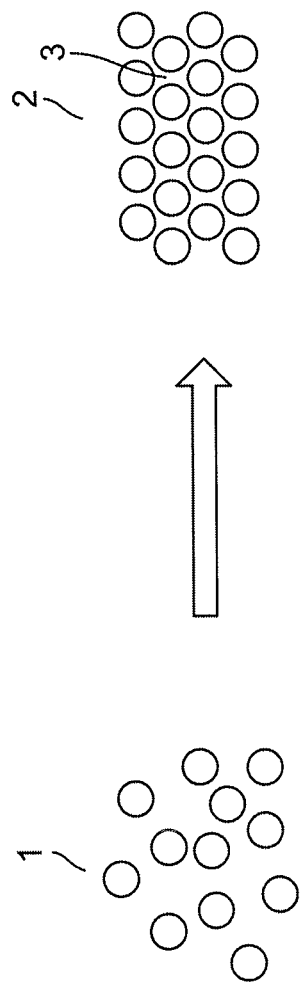
FIG. 1 is a schematic depicting an example of sintering a plurality of nanoparticles, according to aspects of the present disclosure.

The present disclosure is generally directed to a component for use in an electrochemical battery, wherein the component includes a self-supporting porous metal substrate capable of acting as both an electrode and a current collector in an electrochemical battery. Optionally, the pores of the metal substrate may be tailored to have the same diameter or other dimensions of a hard carbon material. While the present disclosure will be described in terms of an LIB, it should be understood that any electrochemical battery capable of performing according to the present disclosure may be used. Example electrochemical batteries that may be used according to certain aspects of the present disclosure include lithium-sulphur, sodium ion, and lead acid, among others.

According to some aspects, the porous metal substrate may be electrically conductive. According to some aspects, the porous metal substrate may comprise a plurality of pores with a particular pore size and/or distribution capable of ion intercalation and release. The present disclosure is also directed to methods of making the components of the present disclosure.

According to some aspects of the present disclosure, the component may comprise a porous metal substrate capable of reacting interstitially with ions, for example, lithium ions, thereby acting as an electrode (e.g., an anode) in an electrochemical battery, for example, an LIB. For example, in the case of an LIB, the component may comprise a porous metal substrate with pores capable of taking up and releasing lithium ions (i.e., lithium ion insertion and extraction) through intercalation or a similar process. As used herein, the term "pore" refers to an opening or depression in the surface, or a tunnel, in the porous metal substrate. According to some aspects, the porous metal substrate may comprise a pore size, pore volume, surface area, density, pore size distribution, and/or pore length similar to a hard carbon material that provides a high capacity electrode in an electrochemical battery, while reducing the risk for the formation of dendrites.

According to some aspects, the pores may have a pore size of from about a few nanometers up to hundreds of micrometers. For example, the pores may have a pore diameter in the range of about 0.001 to 300 nm, preferably in the range of about 0.01 to 200 nm, and more preferably in the range of about 0.1 to 150 nm. According to some aspects, the pores may have an average pore diameter of from about 0.1 to 20 nm, preferably from about 0.1 to 15 nm, and even more preferably from about 0.1 to 10 nm. According to some aspects, the pores may have an average pore diameter of from about 0.1 to 50 nm, preferably from about 10 to 40 nm, and even more preferably from about 20 to 30 nm.

According to some aspects, the pores may have a pore diameter in the range of about 0.0001 to 50 μm, preferably in the range of about 0.0001 to 10 μm, and more preferably in the range of about 0.0001 μm to 5 μm. According to some aspects, the pores may have an average pore diameter from about 0.1 to 20 μm, preferably from about 0.1 to 10 μm, more preferably from about 0.1 μm to 7 μm, and even more preferably from about 0.5 μm to 4 μm. According to some aspects, the pores may have an average pore diameter from about 0.1 to 50 nm, preferably from about 0.1 to 40 nm, more preferably from about 0.1 to 30 nm, even more preferably from about 0.1 to 20 nm, and most preferably from about 1 to 10 nm. In a non-limiting example, the average pore diameter is based on a Brunauer-Emmett-Teller (BET) measurement.

According to some aspects, the pores may have a pore volume of from about $10^{-24}$ to $10^{-6}$ liters.

According to some aspects, the volume of the pores in the porous metal substrate may be in the range of about 0.00001 to 0.00040 $cm^3/g$, preferably in the range of about 0.00001 to 0.00030 $cm^3/g$, and more preferably in the range of about 0.00002 to 0.00020 $cm^3/g$. According to some aspects, the average volume of the pores in the porous metal substrate may be from about 0.0001 to about 1.0 $cm^3/g$, preferably from about 0.0001 to 0.1 $cm^3/g$, more preferably from about 0.0001 to about 0.01 $cm^3/g$, and even more preferably from about 0.001 to about 0.01 $cm^3/g$.

According to some aspects, the porous metal substrate may have a specific surface area of from about less than 1 $m^2/g$ to more than 100 $m^2/g$. For example, according to some aspects, the porous metal substrate may have a specific surface area of from about 0.01 to 20 $m^2/g$, preferably from about 0.1 to 15 $m^2/g$, more preferably from about 1.0 to 10 $m^2/g$, and even more preferably from about 1.0 to 6.0 $m^2/g$.

According to some aspects, the porous metal substrate may have a density of from about 1 to $10^3$ $kg/m^3$. According to some aspects, the pore size distribution may range from micro to meso to macro, and may be either monomodal, bimodal, or multimodal (i.e., may comprise one or more different distribution of pore sizes). According to some aspects, the porous metal substrate may have a pore distribution from nanometers up to millimeters. According to some aspects, the pores may have a pore length from a few nanometers up to several centimeters.

FIGS. 11a-11d show the results of Brunauer-Emmett-Teller (BET) surface area measurements corresponding to an example porous hard carbon material according to aspects of the present disclosure. Specifically, FIGS. 11a-11d correspond to material that is similar to the material disclosed in U.S. Patent Application Publication No. 2007/0287068, that is, an anode formed from a pitch-based hard carbon having an average particle size of preferably between 5 and 15 µm, a surface area of between 0.5 and 15 m²/g, an interlayer spacing $d_{002}$ of between 0.355 and 0.400 nm, and a density of between 1.50 and 1.60 g/cm³. The anode may be formed by mixing the hard carbon material with polyvinylidene to form a paste together with N-methyl-2-pyrrolidore, which may then be applied to a copper foil, dried, and then pressed to provide the electrode.

It should thus be understood that FIGS. 11a-11d show measurements that are similar to or the same as measurements corresponding to the porous metal substrate of the present disclosure, as the porous metal substrate of the present disclosure may comprise a pore size, pore volume, surface area, density, pore size distribution, and/or pore length similar to that of hard carbon.

Figure 12A:
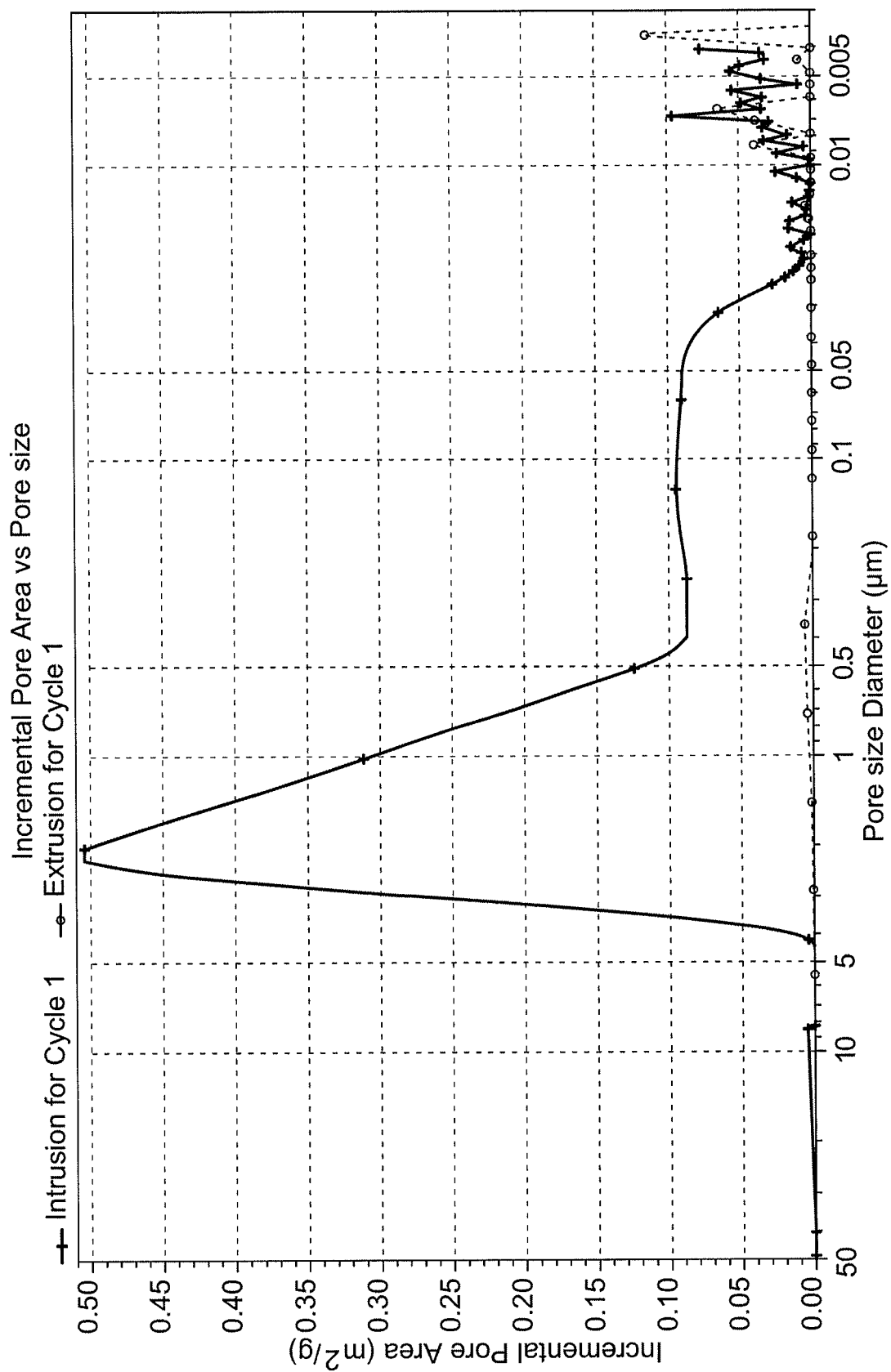
FIGS. 12a and 12b show mercury porosity measurements corresponding to an example hard carbon material according to the present disclosure.
Figure 12B:
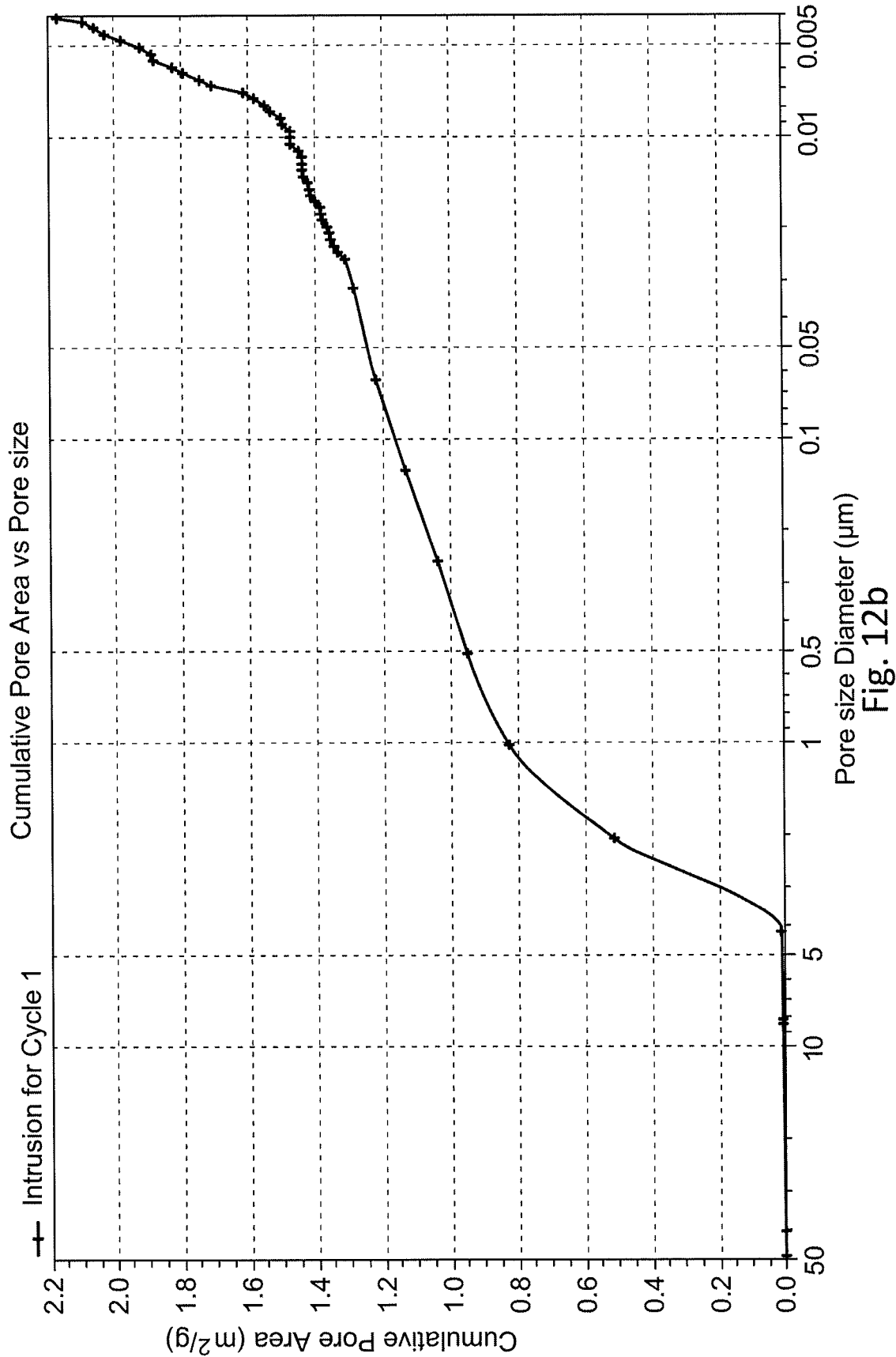

As can be seen, for example, in FIG. 11a, the adsorption average pore diameter was found to be about 6.76 nm, and the Barrett-Joyner-Halenda (BJH) adsorption average pore diameter was found to be about 27.95 nm or about 25.56 nm. FIGS. 12a and 12b show mercury porosity measurements corresponding to an example hard carbon material according to the present disclosure. As can be seen by these figures, the hard carbon material showed a pore size distribution with a peak ranging from about 0.5 to 4 µm pore diameter, with multiple peaks ranging from about 0.1 to 20 nm.

According to some aspects, the component may have a specific capacity in an electrochemical battery, such as an LIB, that is greater than that of graphene. For example, the component may have a specific capacity in an LIB greater than about 350 Ah/kg, alternatively greater than 400 Ah/kg, alternatively greater than about 425 Ah/kg. According to some aspects, the component may have a specific capacity in an electrochemical battery that is equal to or greater than the specific capacity of hard carbon in an electrochemical battery. For example, the component may have a specific capacity in an electrochemical battery that is equal to or greater than about 450 Ah/kg. According to some aspects, the specific capacity of the component in an electrochemical battery may also be less than 350 Ah/kg. For example, according to some aspects, the component may comprise a porous metal substrate without an additional material (e.g., a current collector) thereby rendering a net capacity of less than 350 Ah/kg sufficient for use according to the present disclosure.

According to some aspects, the component may be comprised of an electrically conductive porous metal substrate capable of collecting electric charge, for example, a metal. Examples of metals useful in the present disclosure include copper, nickel, platinum, aluminum, and mixtures and/or alloys thereof, among others. According to some aspects, the electrically conductive porous metal substrate comprises copper. Copper is used in anode materials for electrochemical batteries due to a number of benefits, including a higher density than graphite, low cost, high abundance, and environmental impact.

According to some aspects, the electrically conductive porous metal substrate may comprise other metals, including iron, nickel, platinum, aluminum, silver, gold, palladium, iridium, rhodium, ruthenium, osmium, rhenium, titanium, niobium, tantalum, and mixtures and/or alloys thereof, among others. According to some aspects, the component may be capable of both ion (e.g., lithium ion) insertion and extraction in addition to current collection, and thus may be capable of acting as both an electrode (e.g., an anode) and a current collector in an electrochemical battery. As used herein, the term "current collector" refers to a part of an electrochemical battery that provides an electrical connection in order to facilitate the flow of electricity. As used herein, the term "anode" refers to the negative electrode in an electrochemical battery.

According to some aspects, the porous metal substrate may comprise a plurality of metal nanoparticles which have been compressed together, or otherwise solidified. As used herein, the term "nanoparticle" refers to any microscopic particle that is measured on the nanoscale, including a nanosphere. According to some aspects, the porous metal substrate may comprise a plurality of nanoparticles which have been sintered. According to some aspects, the nanoparticles may be compacted by solid state sintering, wherein a powder of the nanoparticles are bonded together into a mass by applying heat. For example, nanoparticles may be placed into a mold or die, and subjected to high heat in a non-oxidizing atmosphere, wherein the resultant component is a mass with pores therein. As used herein, a "non-oxidizing atmosphere" refers to an atmosphere in which the material comprised in the nanoparticles is not oxidized, including an inert atmosphere and a reducing atmosphere. According to some aspects, compression of the nanoparticles is terminated before the nanoparticles are completely fused, thereby forming pores in the resultant metal substrate by leaving some space between the compressed nanoparticles. According to some aspects, the sintering temperature may range from 30° C. up to 1000° C. According to some aspects, the sintering time may range from a few minutes up to tens of hours. According to some aspects, the porous metal substrate may be a self-supporting mass. As used herein, a "self-supporting mass" relates to a mass which is not deposited or mounted on a support prior to its incorporation in an electrochemical battery.

For example, as shown in FIG. 1, the porous metal substrate may be manufactured using a plurality of nanoparticles (1) which are sintered to form a solid mass (2) with pores (3) therein. For example, the pores may result from the space between the nanoparticles prior to sintering. In a non-limiting example, the nanoparticles are copper nanoparticles. During sintering, the copper nanoparticles are held in a mold under pressure and the temperature is increased to a temperature below the melting point of the copper nanoparticles so that the atoms in the copper nanoparticles diffuse across the boundaries of the copper nanoparticles to bond the copper nanoparticles to form the porous metal substrate. The size of the resulting pores can be tailored by selecting a specific diameter of nanoparticles or metal particle precursor, as well as the operating conditions during the sintering process (e.g., temperature, pressure, residence time in the mold). Accordingly, a particular metal nanoparticle diameter or metal precursor can be selected that can produce a porous metal substrate with a pore size distribution similar to that of hard carbon. Variation of the metal nanoparticle size allows for varying the pore size and its distribution to obtain improved Li capacity without (or with reduced) dendrite formation in analogy with hard carbon.

According to some aspects, the nanoparticles used for making the porous metal substrate may have a size in the nanometer range. For example, the nanoparticles may have a diameter such that when the nanoparticles are compacted together, the resultant mass comprises pores which have a pore size and distribution as disclosed herein. According to some aspects, the porous metal substrate may comprise a plurality of compacted nanoparticles with uniform size, while according to other aspects, the porous metal substrate may comprise a plurality of compacted nanoparticles with various sizes. According to some aspects, at the porous metal substrate's specific capacity, the plurality of pores may be capable of ion (e.g., lithium ion) insertion and extraction without the formation of dendrites.

According to some aspects, the porous metal substrate may be a metal foam formed by heating or sintering a metal precursor. The metal precursor may be a metal salt, such as copper (II) sulphate pentahydrate and may be heated with an additive, such as dextran gel, in an oven to 600° C. in the presence of air to for example, hydrate the gel, burn off the dextran, and oxidize the metal salt to form a metal oxide monolith. The resulting metal oxide foam may be placed in an oven and exposed to hydrogen at a temperature of 1000° C. to convert the metal oxide foam to a metal foam.

According to some aspects, the porous metal substrate may be prepared by a dealloying process. According to some aspects, the porous metal substrate may be a monolithic structure prepared by a chemical dealloying process and/or an electrochemical dealloying process.

For example, according to some aspects, the porous metal substrate may be prepared using a chemical dealloying process wherein a metal alloy comprising at least a first metal component and a second metal component may be exposed to a selectively corrosive component such that at least the second component is leached from the alloy, thereby providing a porous metal substrate comprising the first component.

For example, according to some aspects, Mg—Cu alloy ingots may be prepared, and then melted (for example, by high-frequency induction heating) prior to melt-spinning onto a roller (for example, a copper roller) to obtain alloy ribbons. The resultant ribbons may then be exposed to an HCl solution (for example, a 1 wt. % HCl aqueous solution) for a certain period of time such that the Mg is dealloyed (or removed) from the sample. The sample may then be rinsed to provide a resultant porous copper substrate.

In another example, according to some aspects, an Mg—Cu alloy film may first be deposited on a solid foil (for example, a copper foil). The foil may then be exposed to an HCl solution (for example, a 10 mM HCl solution and deionized water that was first bubbled with $N_2$ gas for 30 minutes) for a certain period of time such that the Mg is dealloyed (or removed) from the film. The residual acid may then be removed (for example, by rinsing with $N_2$ bubbled water) from the film in order to provide a resultant porous copper substrate.

According to some aspects, the self-supporting metal substrate may comprise a porous metal first layer positioned on a non-porous metal second layer. In one example, according to some aspects, an alloy film containing copper and manganese may first be deposited on a solid foil (for example, a copper foil). The foil may then be exposed to an HCl solution (for example, a 10 mM HCl solution and deionized water that was first bubbled with N2 gas for 30 minutes) for a certain period of time such that the manganese is dealloyed (or removed) from the film. The residual acid may then be removed (for example, by rinsing with N2 bubbled water) from the film in order to provide the porous metal substrate comprising a porous copper layer on the copper foil. Accordingly the self-supporting copper substrate may comprise a porous copper layer positioned on a non-porous copper layer.

According to some aspects, when the self-supporting metal substrate comprises a porous metal first layer positioned on a non-porous metal second layer, the first layer and the second layer may have the same or different thicknesses, wherein thickness is defined as the distance between an outer surface of the first or second layer and the surface of the first or second layer abutting the other one of the first or second layer. For example, according to some aspects, the thickness of the porous metal first layer may be smaller than the thickness of the non-porous metal second layer. According to some aspects, the thickness of the porous metal first layer may be from about 400 to 1000 nm, optionally from about 500 to 900 nm, optionally from 600 to 800 nm, and optionally about 700 nm, while the thickness of the non-porous metal second layer may be from 0.01 to 20 μm, optionally from about 5 to 15 μm, and optionally about 10 μm.

According to some aspects, the non-porous metal second layer may be arranged such that it is towards the exterior of an electrochemical battery comprising the self-supporting metal substrate. For example, in an electrochemical battery comprising a separator positioned between a cathode and a component comprising the self-supporting metal substrate, the non-porous metal second layer may be arranged towards the exterior of the battery while the porous metal first layer may be arranged towards the separator.

According to some aspects, the porous metal substrate may be prepared using an electrochemical dealloying process, wherein a metal alloy comprising a at least a first metal component and a second metal component, the second metal component acting as an anode with respect to the first metal component, may be exposed to an electrolyte such that at least the second metal component is selectively dealloyed (or removed) due to galvanic corrosion, thereby providing a porous metal substrate comprising the first component.

For example, according to some aspects, an alloy (for example, a Cu—Si alloy) may be provided as a thin film on a substrate. The film may then be dealloyed by selectively dissolving, for example, silicon in an electrolyte using an externally applied voltage, thereby providing a resultant porous copper substrate.

According to some aspects, the component may comprise one or more materials in addition to the porous metal substrate. For example, according to some aspects, the porous metal substrate may be provided with one or more layers of one or more carbon-containing materials. Examples of carbon-containing materials include, but are not limited to, graphene, nanotubes, graphene oxide, graphite, graphite oxide, carbon fiber, fullerene, and combinations thereof. According to some aspects, the carbon-containing material may coat a portion or an entire outer surface of the porous metal substrate, wherein the structure of the substrate (e.g., the pore size) remains substantially the same as the uncoated porous metal substrate. That is, the carbon-containing material may be provided such that the structure of the porous metal substrate is maintained. In addition to, or alternatively, the internal portions of the porous metal substrate that define the pores may be coated with a carbon-containing material. For example, the porous metal substrate may include both a pore size or pore size distribution like that of hard carbon, and at least some of the internal portions of the porous metal substrate that define the pores may be coated with a carbon-containing material.

The carbon-containing material may be provided before, during, or after the production of the porous metal substrate. For example, according to some aspects, the carbon-containing material may be applied to (e.g., may coat) the nanoparticles to be used for making the porous metal substrate.

Alternatively or additionally, a carbon-containing precursor may be applied to (e.g., may coat) the nanoparticles, wherein the carbon-containing precursor may then be converted to the carbon-containing material. For example, a carbon-containing precursor (e.g., an organic material) may be applied to the nanoparticles and then decomposed to the carbon-containing material via pyrolysis.

According to some aspects, the carbon-containing material or the carbon-containing precursor may be applied via a method such as physical or chemical vapor deposition. For example, the nanoparticles to be used for making the porous metal substrate, or the porous metal substrate itself, may be placed inside a furnace under an inert atmosphere wherein they are heated (e.g., ramped up to 1000° C.) for a certain period of time (e.g., 50 minutes) and then exposed to hydrogen for another period of time (e.g., 20 minutes). The carbon-containing material or the carbon-containing precursor (e.g., methane gas) may then be introduced to the furnace in order to provide a coating of the carbon-containing material (e.g., graphene) on the nanoparticles, or the porous metal substrate itself. After the introduction of the carbon-containing material or the carbon-containing precursor, hydrogen may be introduced and the oven may be cooled. With respect to the nanoparticles, they may then be sintered, thereby producing a porous metal substrate coated with the carbon-containing material.

Figure 2A:
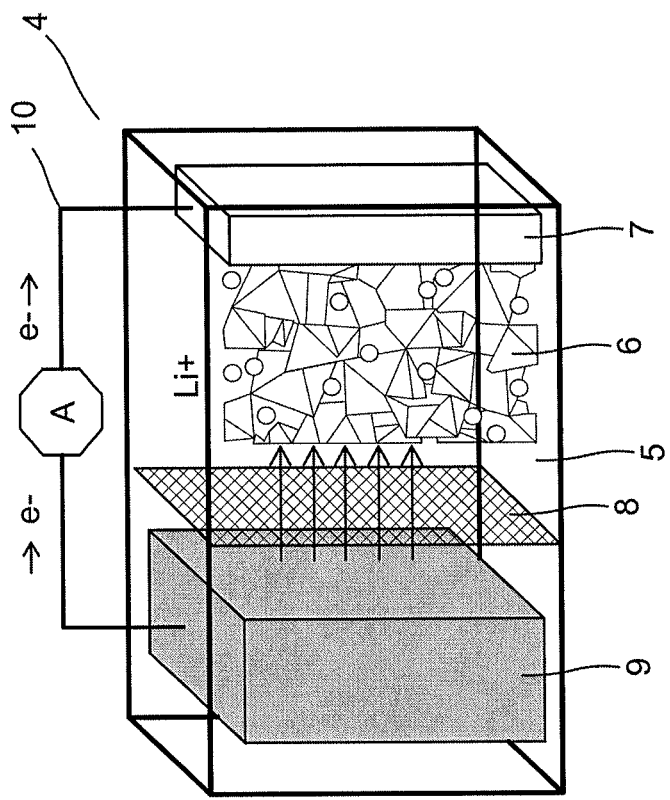
FIG. 2a shows an example of an LIB, according to aspects of the present disclosure.

The present disclosure is also generally directed to electrochemical batteries, such as LIBs, comprising the component of the present disclosure described herein. For example, as shown in FIG. 2a, an LIB may comprise a cell (4) containing a nonaqueous liquid or a solid polymer electrolyte (5) which has a lithium salt dissolved therein capable of dissociating to lithium ions and an anion. Examples of lithium salts include lithium perchlorate, lithium borohexafluoride, and any other lithium salts soluble in the electrolyte. The LIB according to the present disclosure may also comprise a cathode (6) used in conventional LIBs, for example, comprising a positive active material mixed with the non-aqueous electrolyte, and optionally a binder and/or other additives. Examples of compounds useful in the positive active material include lithium cobalt oxide and lithium iron phosphate, or any other compounds known in the art. According to some aspects, the LIB may also comprise a current collector (7) in close proximity to the external face of the cathode (6), and a separator (8), for example, a perforated or microporous organic polymer membrane that allows the passage of lithium ions therethrough. According to some aspects, the component (the self-supporting porous metal substrate) (9) of the present disclosure may function in the LIB as both the anode and current collector. That is, according to some aspects, component (9) is the only anode material comprised in the LIB. According to some aspects, lithium ions may move from the component (9) to the cathode (6) via the electrolyte (5) during discharge while electrons, or electric current, flow from the component (9) to the cathode (6) through an outer circuit (10). According to some aspects, the lithium ions and the electrons may move in the opposite direction via the electrolyte (5) or through an outer circuit (10), respectively, when the LIB is recharging.

Figure 2B:
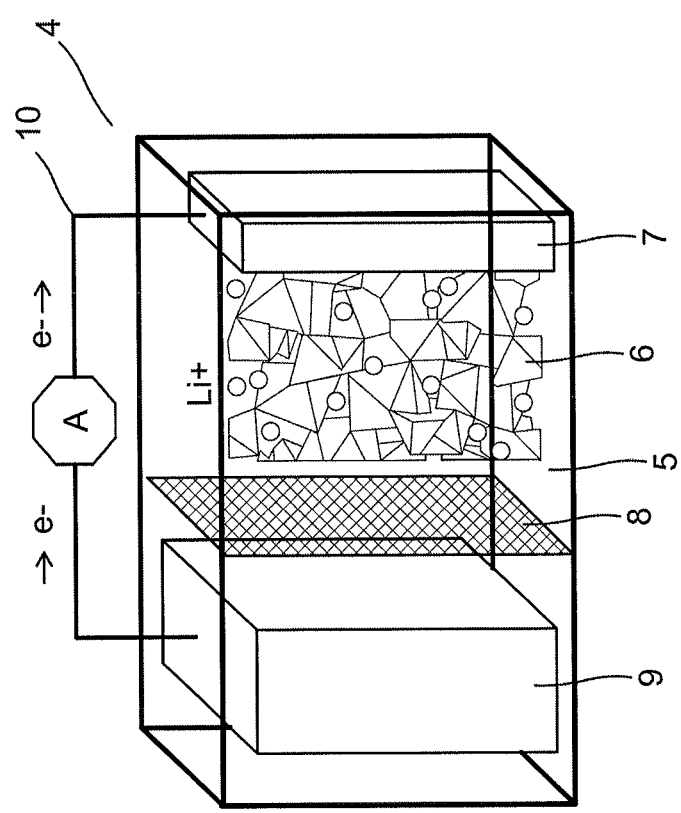
FIG. 2b shows an example of an LIB, according to aspects of the present disclosure.

According to some aspects, the component (9) may comprise an outer layer which prevents unfavorable chemical interactions, for example, interactions between the porous metal substrate and an electrolyte in an electrochemical battery. For example, the porous metal substrate may comprise one or more layers of graphene thereon as shown in FIG. 2b. According to some aspects, one or more layers of graphene may be grown on and/or in the porous metal substrate by any means known in the art, for example, chemical vapor deposition.

The present disclosure is also directed to methods of making the components described herein. For example, aspects of the present disclosure comprise providing a plurality of metal nanoparticles, and subjecting the plurality of metal nanoparticles to high heat in a non-oxidizing atmosphere in order to sinter the nanoparticles thereby producing a metal substrate with pores therein. The plurality of nanoparticles may be provided, for example, in a powder. According to some aspects, the nanoparticles may be provided in a mold or die prior to heating. According to some aspects, the component may be shaped after the nanoparticles have been sintered.

According to some aspects, the present disclosure is directed to methods of producing the components described herein using a chemical dealloying process and/or an electrochemical dealloying process. For example, according to some aspects, a porous metal substrate may be prepared using a chemical and/or electrochemical dealloying process wherein at least a second metal component may be removed from an alloy comprising the second metal component and a first metal component, thereby providing a porous metal substrate comprising the first metal component.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The following examples are put forth so as to provide those of ordinary skill in the art with a complete disclosure and description of how to make and use the present disclosure, and are not intended to limit the scope of what the inventors regard as their disclosure nor are they intended to represent that the experiments below are all or the only experiments performed. Efforts have been made to ensure accuracy with respect to numbers used (e.g. amounts, dimensions, etc.) but some experimental errors and deviations should be accounted for.

EXAMPLE

The following study was conducted in order to compare components according to the present disclosure with a graphite electrode dispersed on a copper current collector.

Preparation and Function of a Battery with a Reference Electrode

Figure 3:
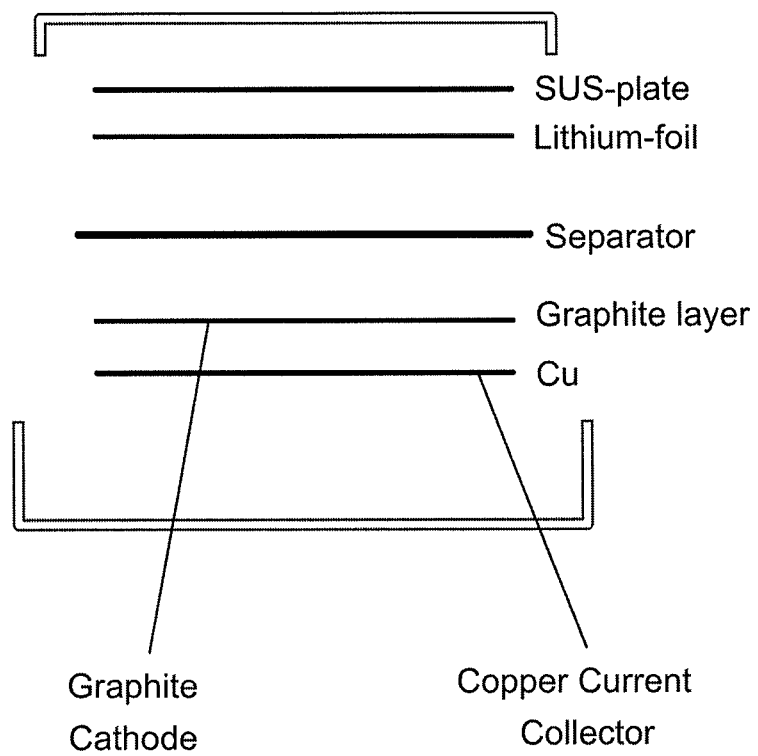
FIG. 3 shows a coin cell battery construction including a reference electrode including a separate current collector.
Figure 4A:
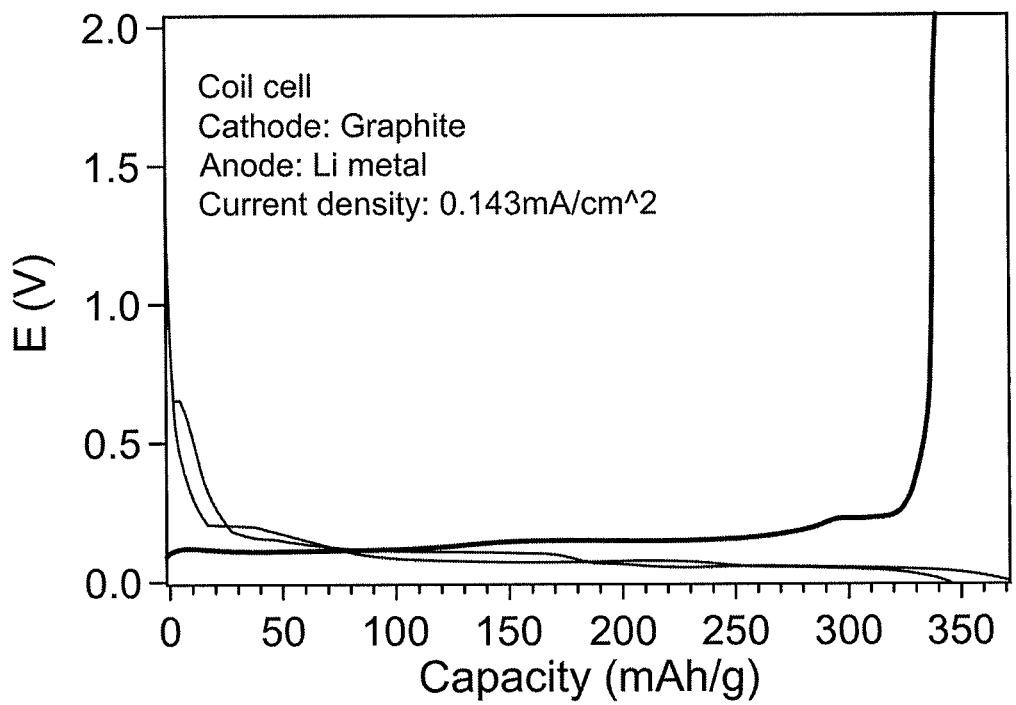
FIGS. 4a, 4b, 4c, and 4d show the performance of the reference electrode of FIG. 3 after each of three cycles of charging and discharging.
Figure 4B:
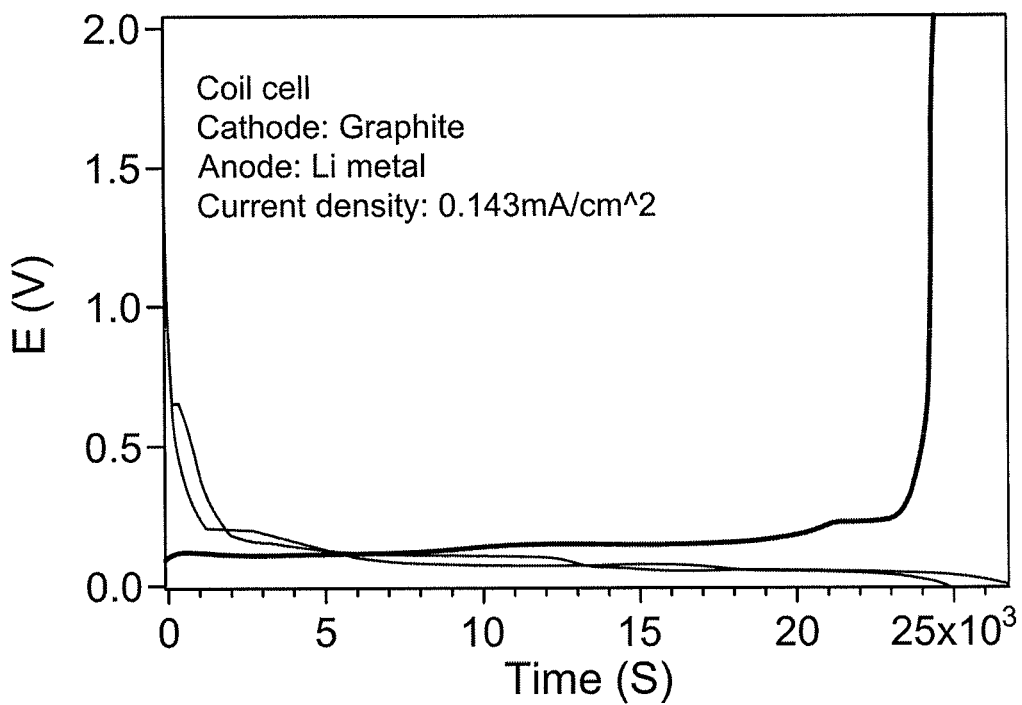
Figure 4C:
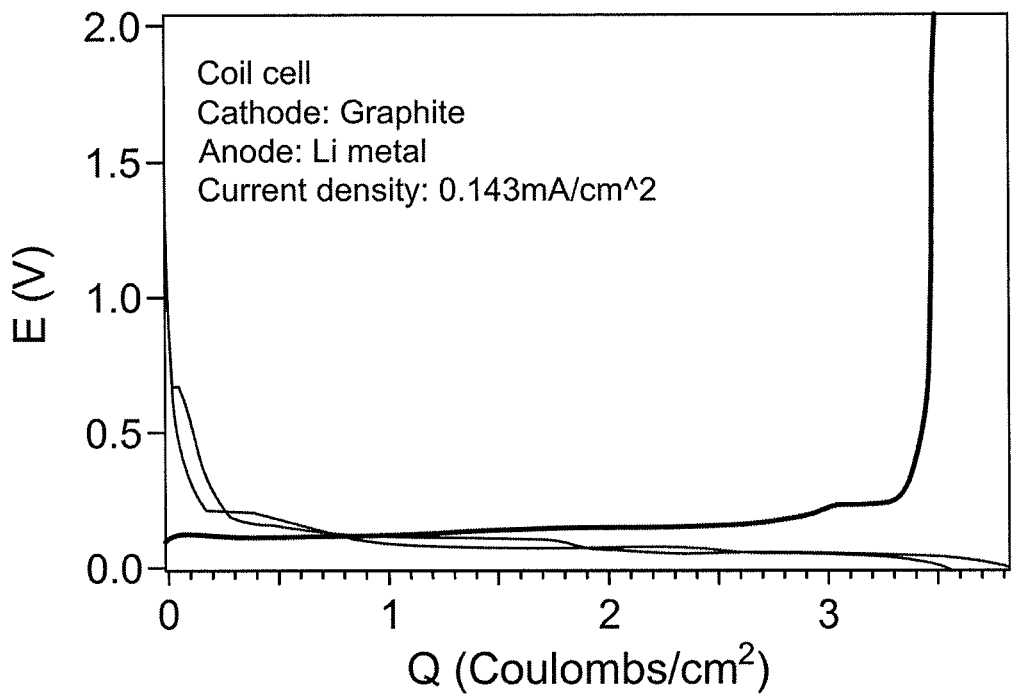
Figure 4D:
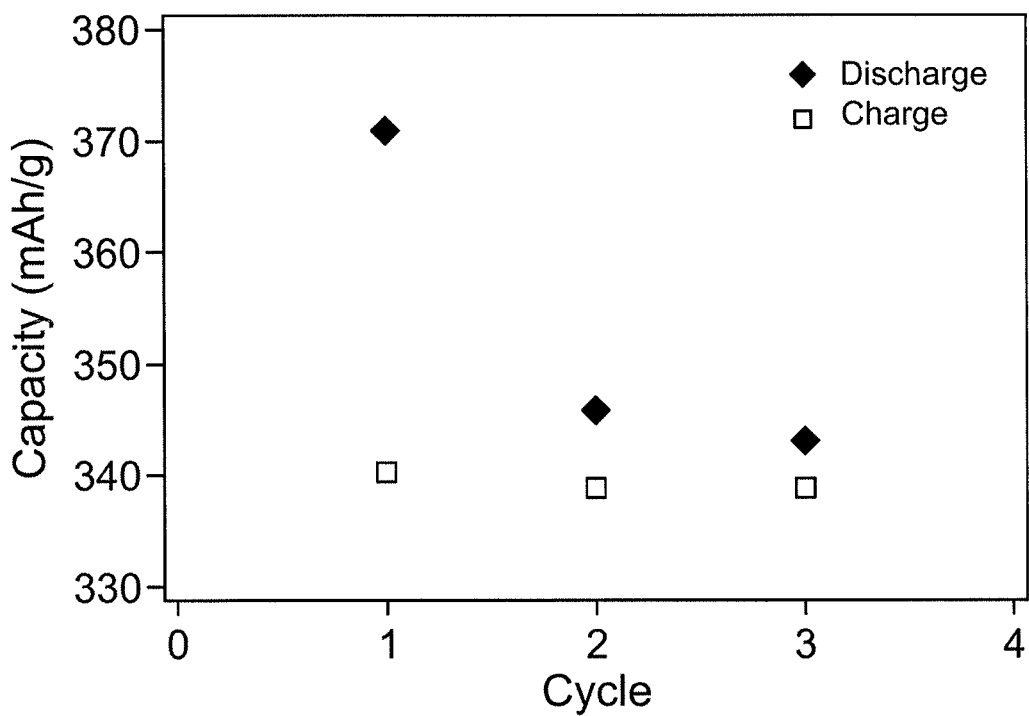

As shown in FIG. 3, a coin cell battery comprising a conventional graphite cathode dispersed on a copper current collector was produced. Specifically, a coin cell battery type CR2332 having a voltage range of 0V-2.0V and comprising a Celgard PP film separator, 1M LiPF6 EC-DEC as an electrolyte, a Li 380 umt anode, and a graphite cathode was prepared. The electrodes were prepared using a hand printing method with 5% binder. The graphite electrode comprised the following parameters:

| | |
|---|---|
| Electrode Diameter | 1.4 cm |
| Electrode Area | 1.54 cm$^2$ |
| Surface Density | 2.86 mg/cm$^2$ |
| Current Density | 0.143 mA/cm$^2$ |

The coin cell battery was discharged and recharged through three complete cycles. The graphite electrode showed a reversible capacity of about 340 mAh/g after three cycles. FIGS. 4a, 4b, 4c, and 4d illustrate performance characteristics of the reference electrode. The performance of the reference electrode indicates that both the electrode preparation process and the coil cell configuration worked properly.

Preparation and Function of a Battery with a Microporous Copper Electrode

Figure 5:
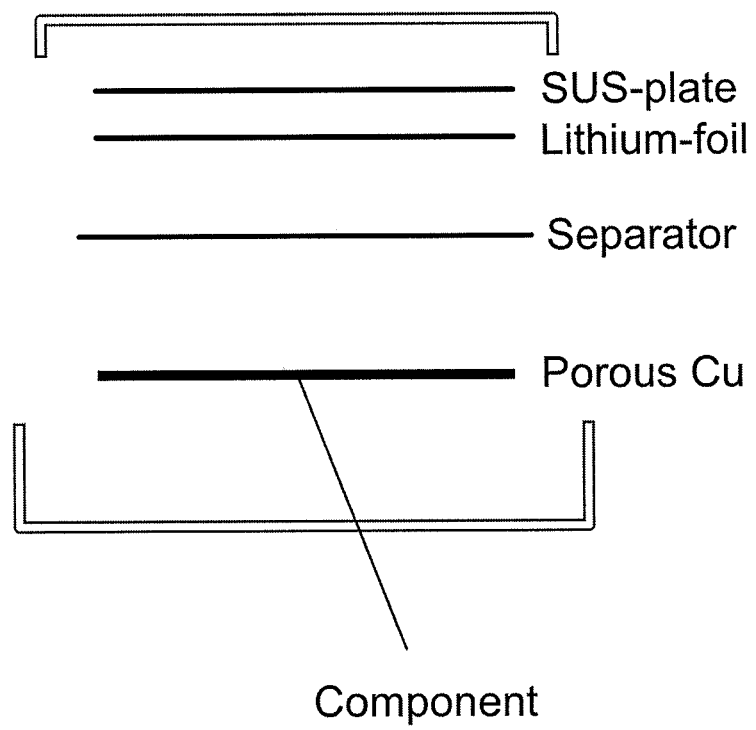
FIG. 5 shows a coin cell battery construction including a microporous copper electrode without a separate current collector according to the present disclosure.

As shown in FIG. 5, a coin cell battery comprising a component according to the present disclosure was produced. Specifically, a coin cell battery type CR2332 having a voltage range of 0V-2.0V and comprising a Celgard PP film separator, 1M LiPF6 EC-DEC as an electrolyte, a Li 380 umt anode, and a microporous copper cathode was prepared. A separate current collector was not included.

The microporous copper electrode was prepared using copper foam from MTI Corporation. The copper foam had a thickness of 1.6 mm, and a pore size of about 231 μm. The resultant microporous copper electrode comprised the following parameters:

| | |
|---|---|
| Electrode Diameter | 1.4 cm |
| Electrode Area | 1.54 cm$^2$ |
| Surface Density | 35 mg/cm$^2$ |
| Current Density | 0.01 mA/cm$^2$ |
| Thickness: | 1.6 mm |
| Pore Size | about 231 μm (110 pores per inch) |

Figure 6A:
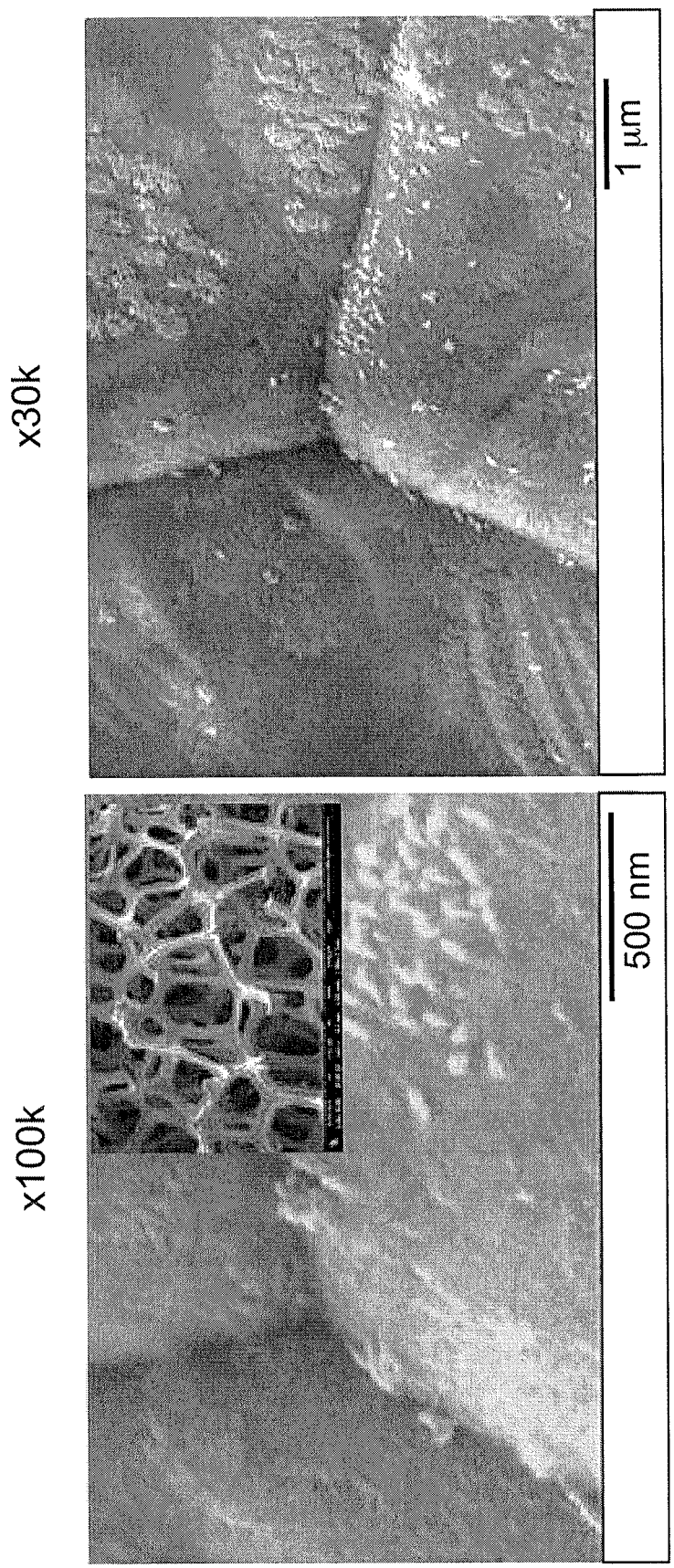
FIG. 6a shows scanning electron microscope images of the surface of the microporous copper electrode of the coin cell battery construction of FIG. 5 according to the present disclosure before three cycles of charging and discharging.
Figure 6B:
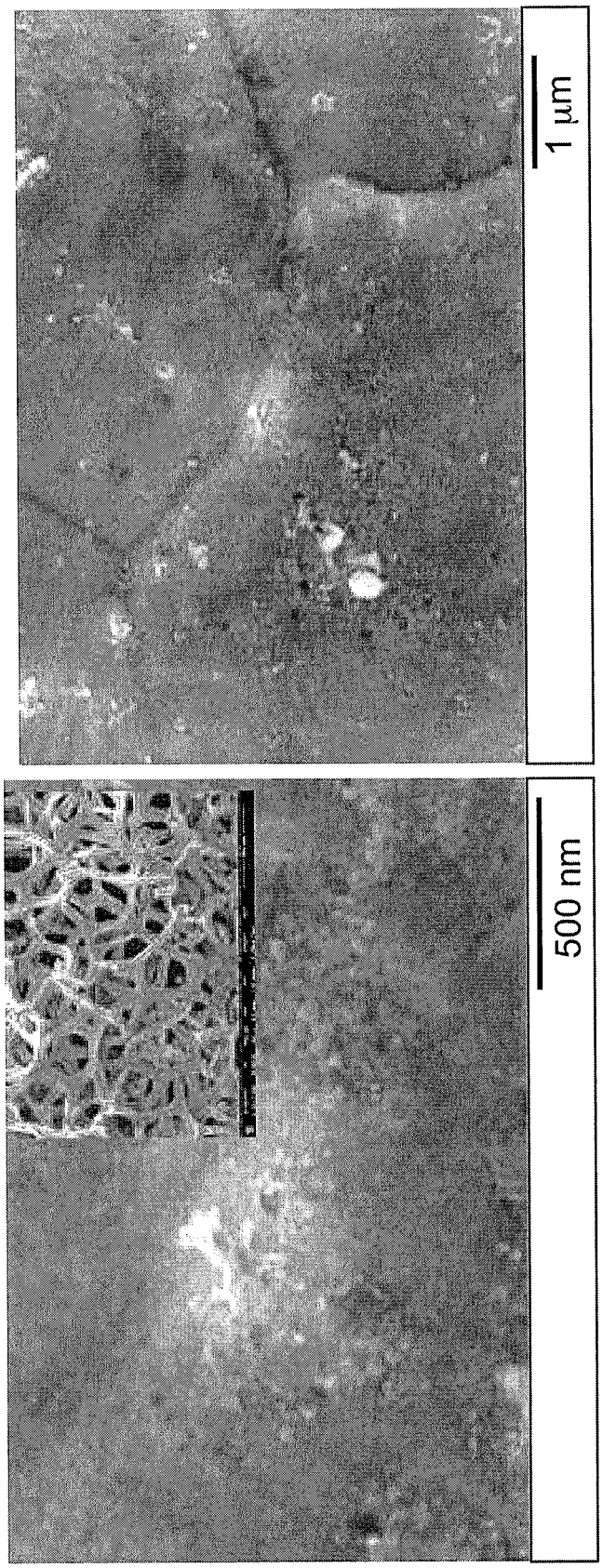
FIG. 6b shows scanning electron microscope images of the surface of the microporous copper electrode of the coin cell battery construction of FIG. 5 according to the present disclosure after three cycles of charging and discharging.

The coin cell battery was discharged and recharged through three complete cycles. Using a scanning electron microscope (SEM), the surface of the microporous copper electrode was compared before and after the three cycles, as shown in FIG. 6. Specifically, FIG. 6 shows that there was no significant difference between the microporous copper electrode before (FIG. 6a) and after (FIG. 6b) testing, confirming that the microporous copper material was stable and suitable for use in an electrochemical battery.

Figure 7A:
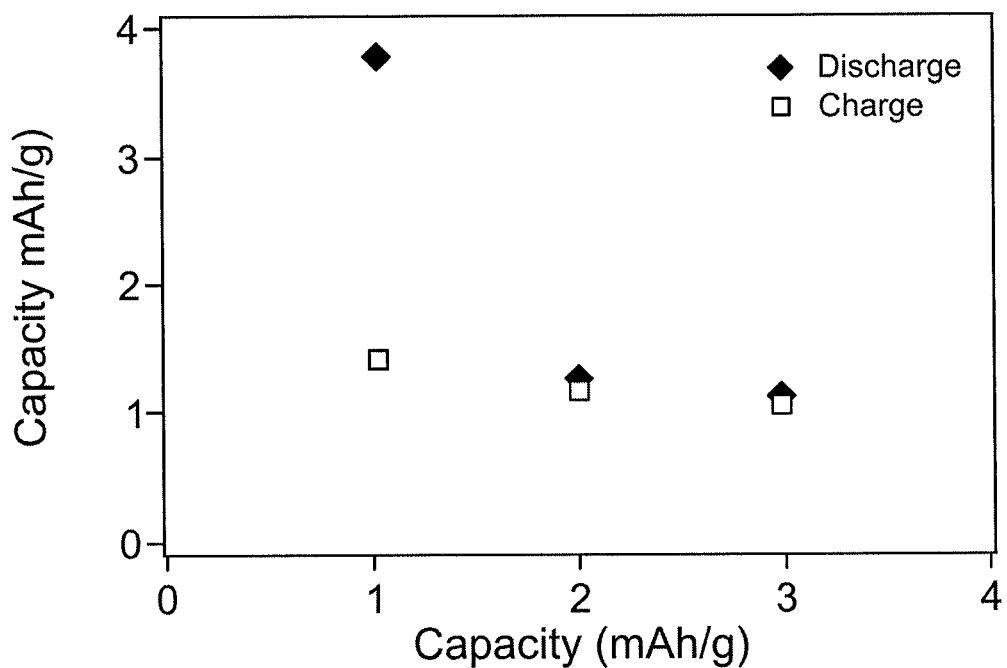
FIGS. 7a, 7b, 7c, and 7d shows the performance of the microporous copper electrode of the coin cell battery construction of FIG. 5 according to the present disclosure after each of three cycles of charging and discharging.
Figure 7B:
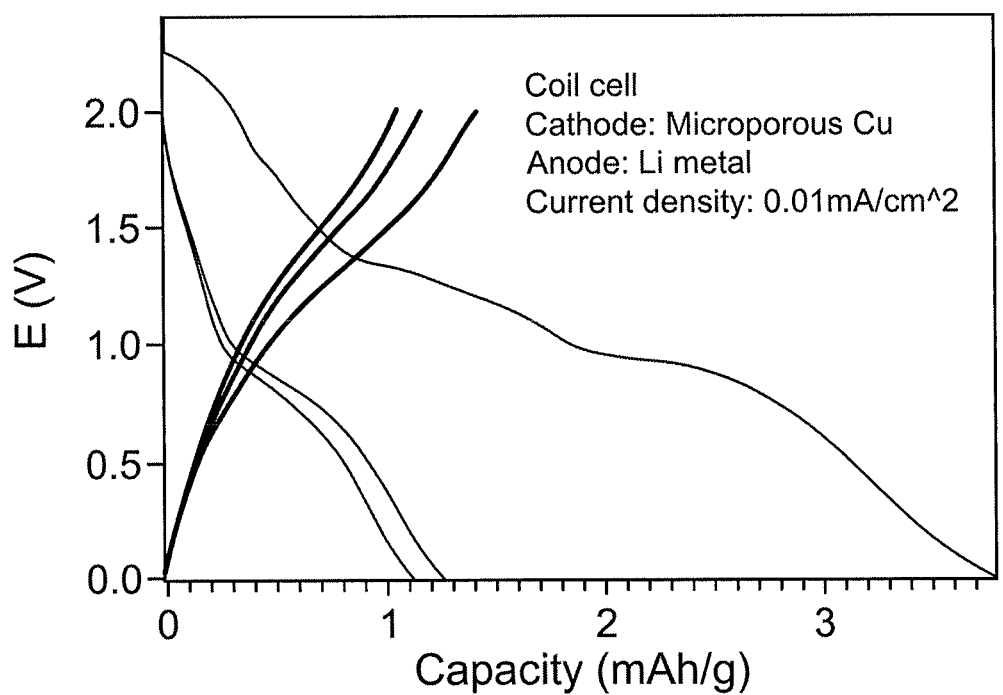
Figure 7C:
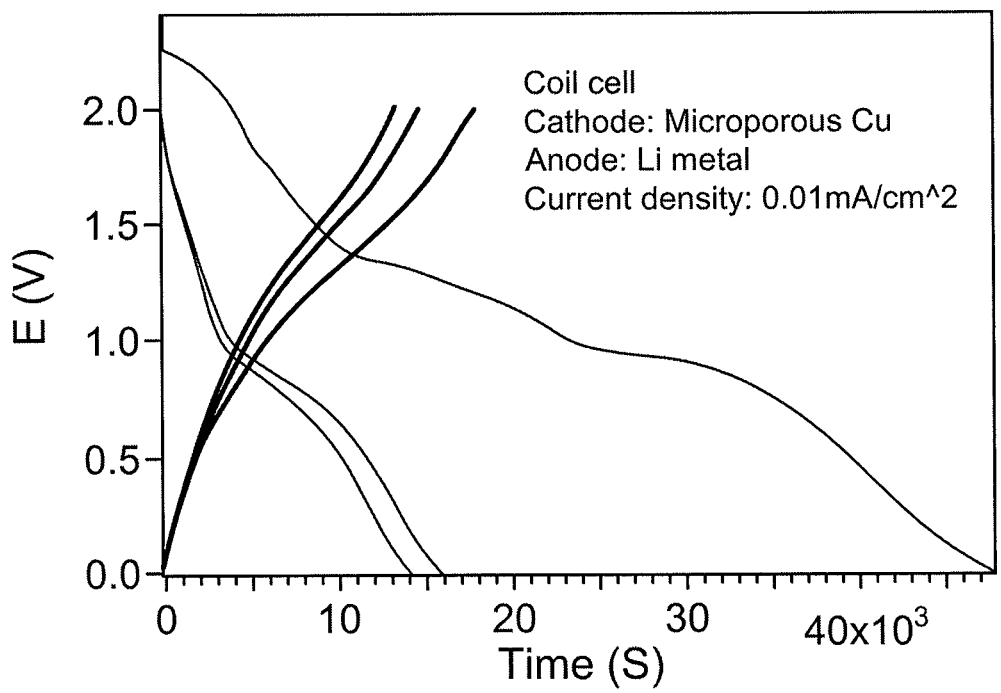
Figure 7D:
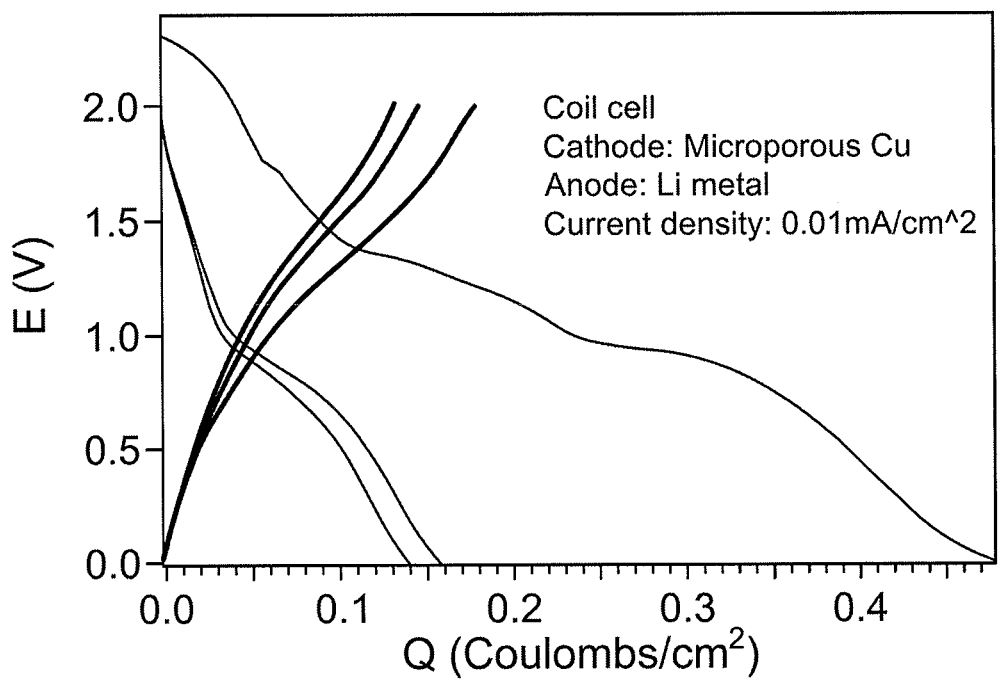

However, as shown in FIGS. 7a and 7b, the microporous copper electrode showed a low capacity of about 1 mAh/g after three cycles of discharging and recharging. The additional performance characteristics of the coin cell battery are shown in FIGS. 7c and 7d. Irreversible capacity shown in the first cycle is likely due to SEI (solid-electrolyte interphase) formation. The Coulomb efficiency is very good, indicating a very reversible performance. The low capacity is likely due to an inefficient pore size (too large of a pore size for the electrode).

Preparation and Function of a Battery with a Nanoporous Copper Electrode

Figure 8:
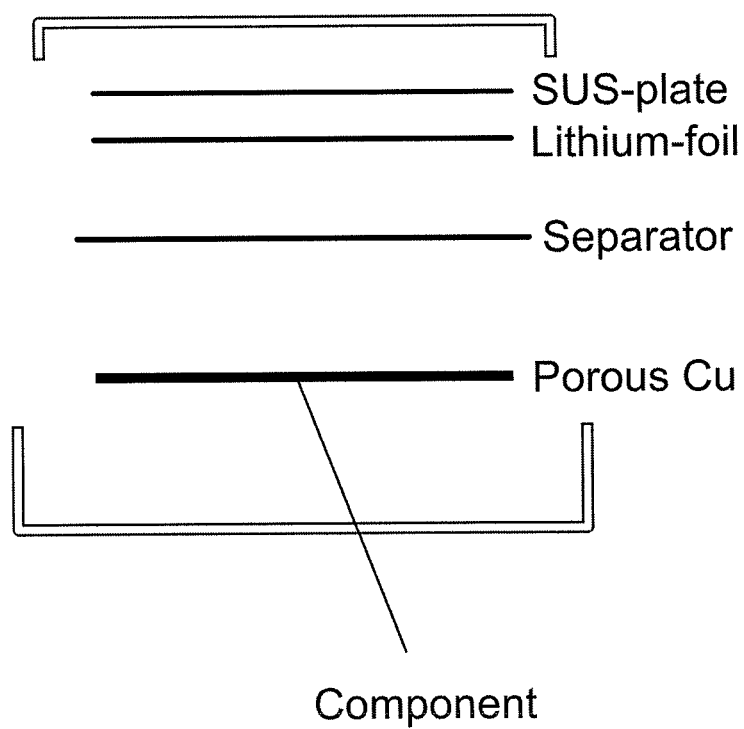
FIG. 8 shows a coin cell battery construction including a nanoporous copper electrode without a separate current collector according to the present disclosure.

As shown in FIG. 8, a coin cell battery comprising a component according to the present disclosure was produced with a porous copper cathode comprising a smaller pore size. Specifically, a coin cell battery type CR2332 having a voltage range of 0V-2.0V and comprising a Celgard PP film separator, 1M LiPF6 EC-DEC as an electrolyte, a Li 380 umt anode, and a nanoporous copper cathode was prepared. No separate current collector was included.

The nanoporous copper electrode was prepared using nanoporous copper material from Jilin University. The material had a thickness of 700 nm, a pore size of about 50 nm, and was prepared using a chemical dealloying process substantially similar to the chemical dealloying processes described herein. The resultant nanoporous copper electrode comprised the following parameters:

| | |
|---|---|
| Electrode Diameter | 1.4 cm |
| Electrode Area | 1.54 cm$^2$ |
| Surface Density | 0.21 mg/cm$^2$ |
| Current Density | 0.01 mA/cm$^2$ |
| Thickness: | 700 nm |
| Pore Size | about 50 nm |

Figure 9A:
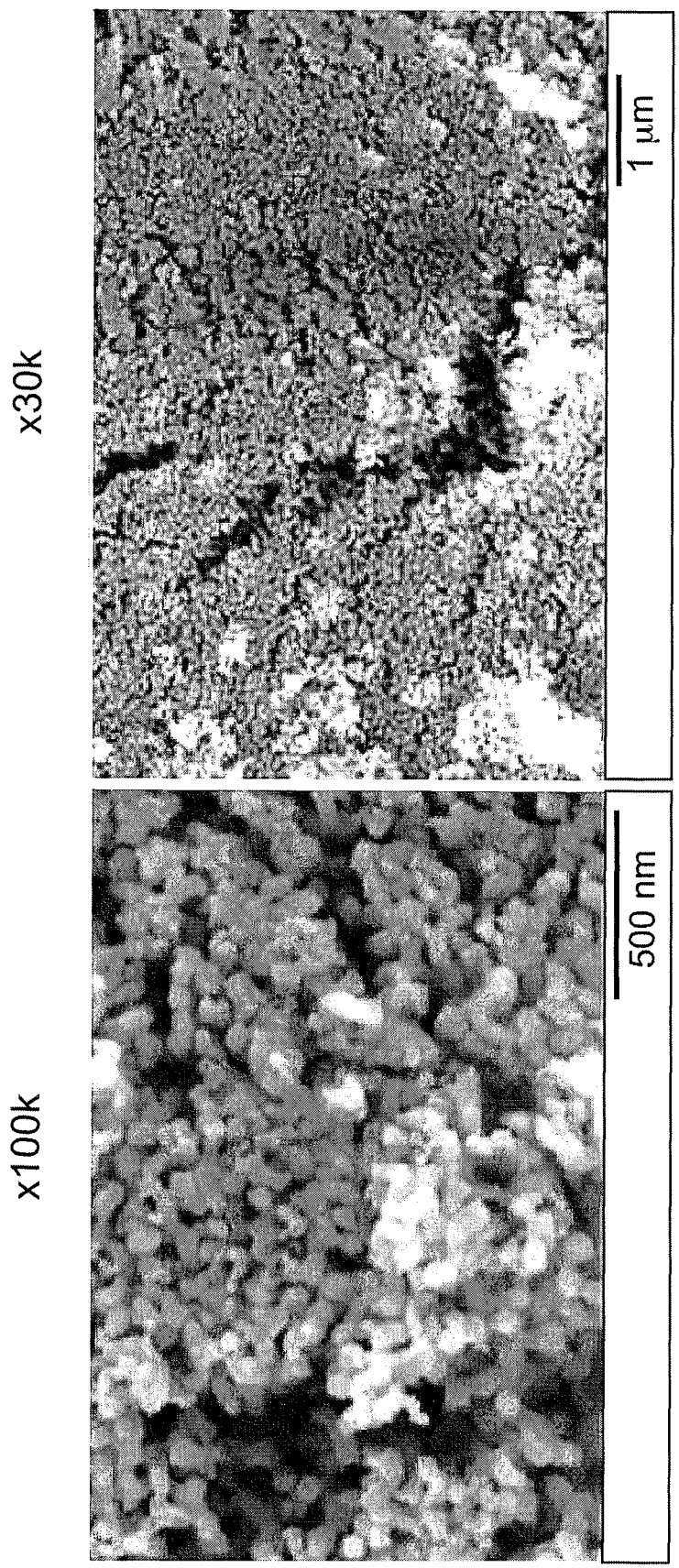
FIG. 9a shows scanning electron microscope images of the surface of the nanoporous copper electrode of the coin cell battery construction of FIG. 8 according to the present disclosure before three cycles of charging and discharging.
Figure 9B:
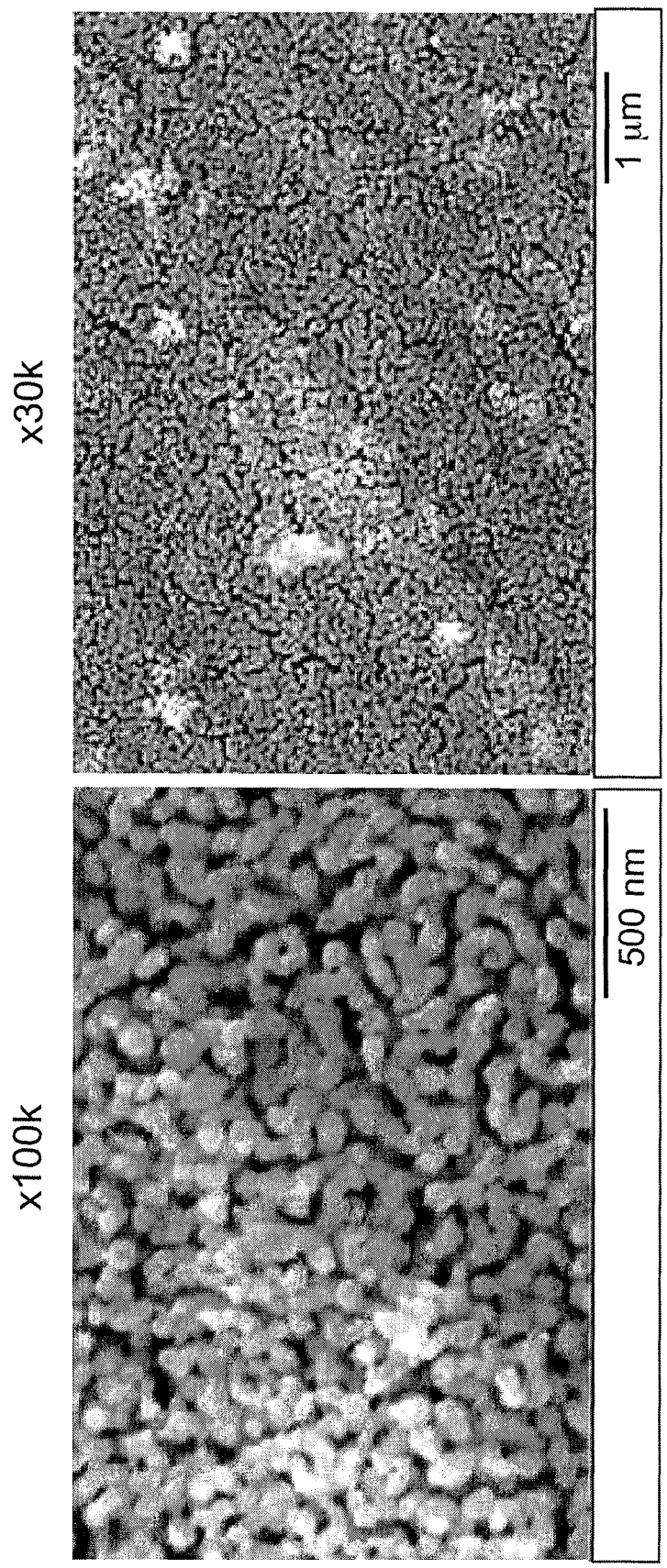
FIG. 9b shows scanning electron microscope images of the surface of the nanoporous copper electrode of the coin cell battery construction of FIG. 8 according to the present disclosure after three cycles of charging and discharging.

The coin cell battery was discharged and recharged through three complete cycles. Using a scanning electron microscope (SEM), the surface of the nanoporous copper electrode was compared before and after the three cycles, as shown in FIG. 9. Specifically, FIG. 9 shows that there was no significant difference between the nanoporous copper electrode before (FIG. 9a) and after (FIG. 9b) testing, confirming that the nanoporous copper material was stable and suitable for use in an electrochemical battery.

Figure 10A:
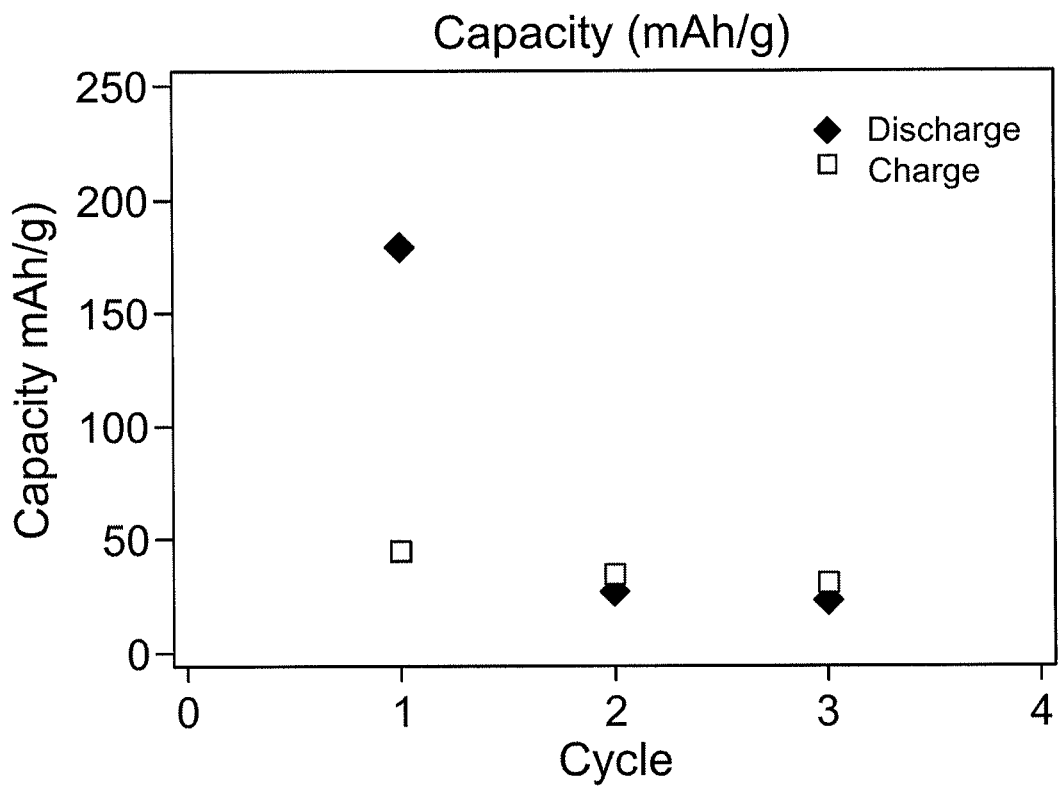
FIG. 10a shows the capacity of the nanoporous copper electrode of the coin cell battery construction of FIG. 8 according to the present disclosure after each of three cycles of charging and discharging.
Figure 10B:
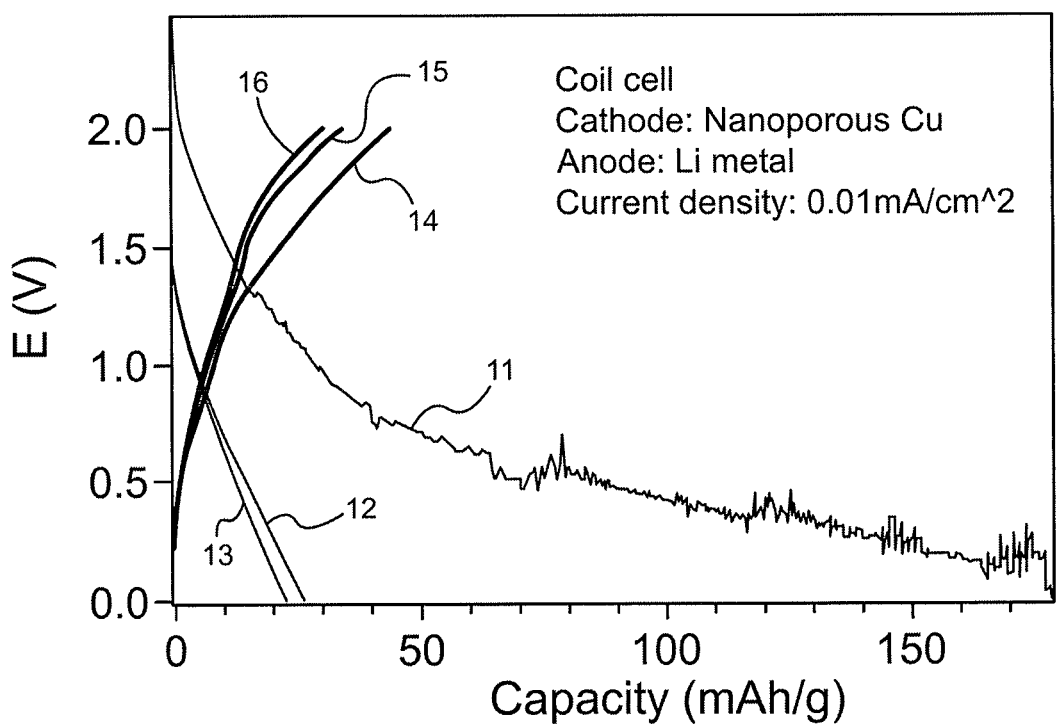
FIG. 10b shows electromotive force vs. capacity of the nanoporous copper electrode of the coin cell battery construction of FIG. 8 according to the present disclosure for each of three cycles of charging and discharging.
Figure 10C:
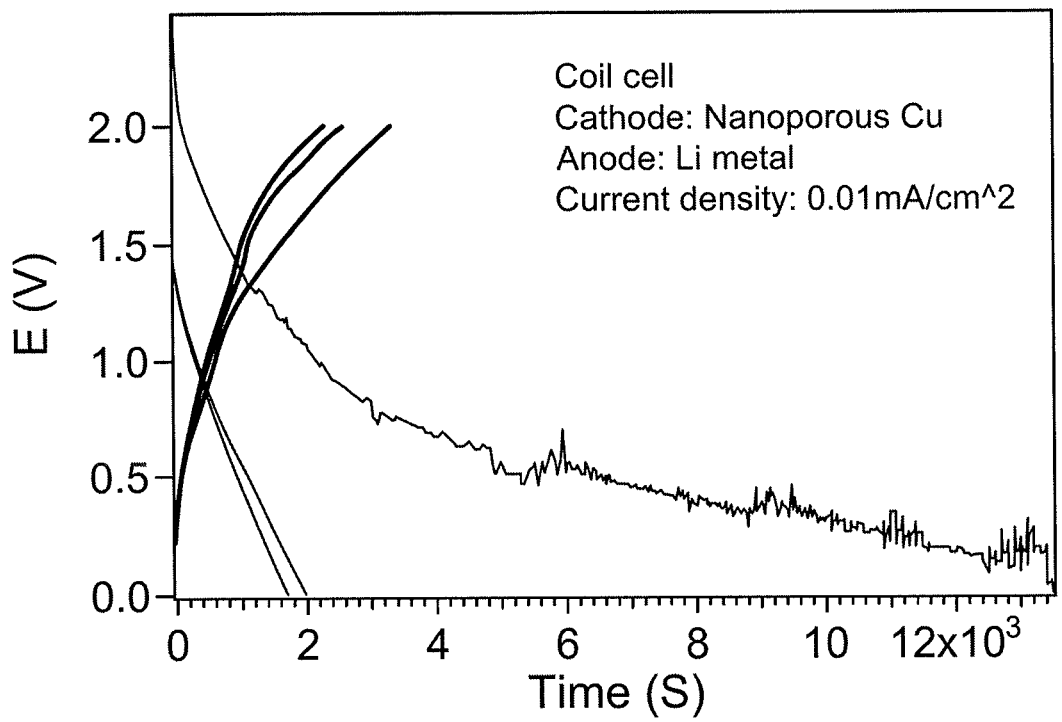
FIGS. 10c and 10d show additional performance characteristics of the nanoporous copper electrode of the coin cell battery construction of FIG. 8 according to the present disclosure after each of three cycles of charging and discharging.
Figure 10D:
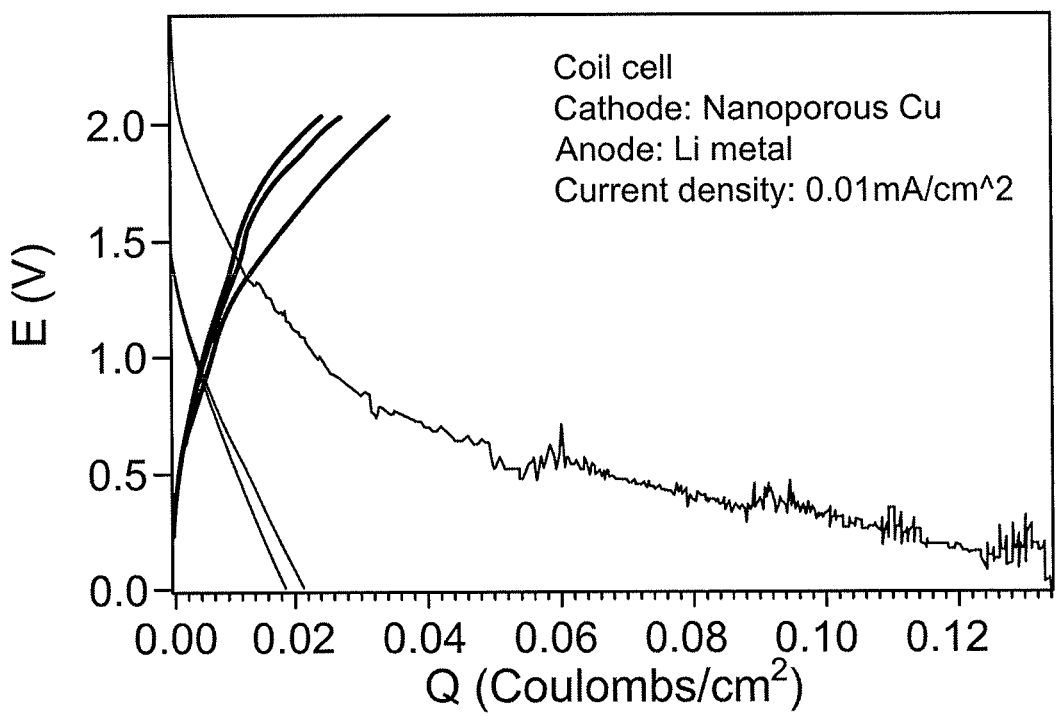
Figure 11B:
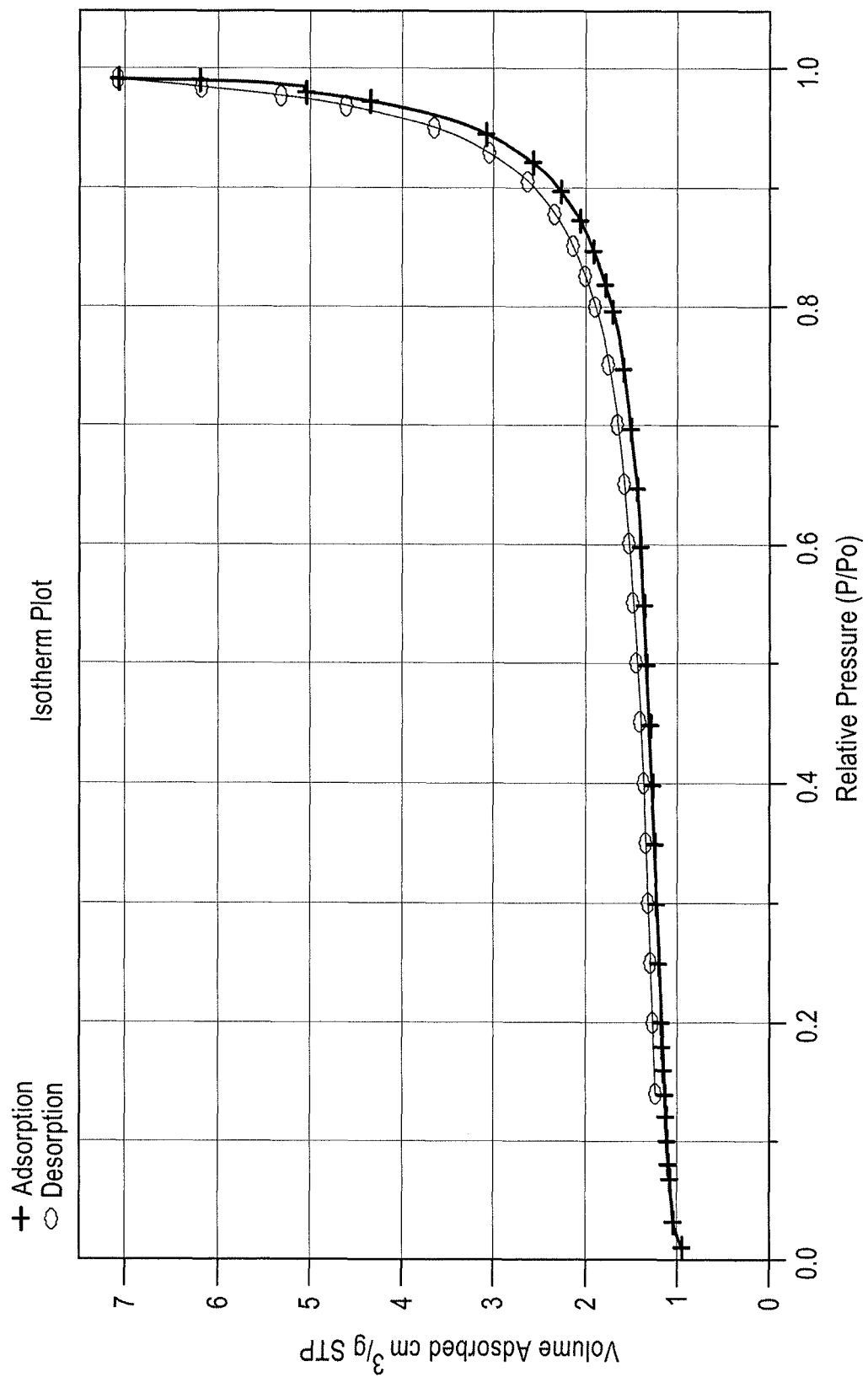
Figure 11C:
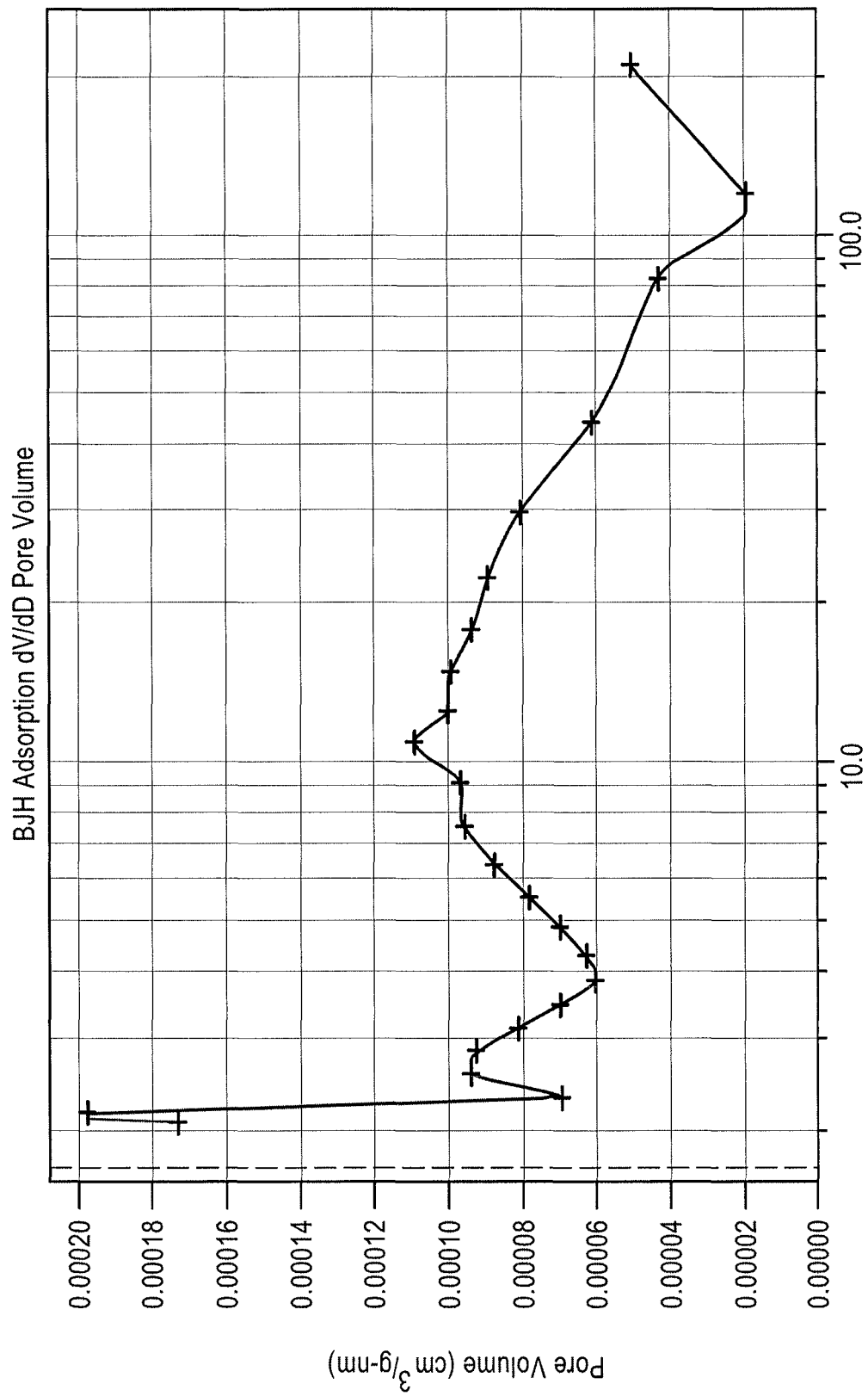

In addition, the capacity of the nanoporous copper electrode was measured after each of the three cycles of discharge or recharge, as shown in FIGS. 10a and 10b. For example, as shown in FIG. 10, the nanoporous copper electrode showed a capacity of about 23 mAh/g after three complete cycles, which is comparable to a typical carbon nanotube electrode and higher than the capacity of the microporous copper electrode after three complete cycles. This can also be seen in FIG. 10b, which shows electromotive force vs. capacity of the nanoporous copper electrode for the first (11), second (12), and third (13) discharge, and first (14), second (15), and third (16) recharge. Therefore, the nanoporous copper electrode was determined to be suitable for use in an electrochemical battery. In addition, it was determined that pore size affects the capacity of components comprising a porous metal substrate.

Therefore, the experiments establish that pure porous copper can act as both a current collector and an active electrode, thereby eliminating the need for a separate current collector. In addition, the distribution of porous copper has a substantial impact on Li storage capacity.

What is claimed is:

1. An anode for use in an electrochemical battery, wherein the anode consists of a self-supporting porous metal substrate, wherein the self-supporting porous metal substrate is electrically conductive, and wherein the self-supporting porous metal substrate consists of copper having a plurality of pores capable of ion insertion and extraction, the plurality of pores having an average diameter ranging from about 0.1 to 40 nm.

2. The anode of claim 1, wherein the anode has a specific capacity in the electrochemical battery that is greater than about 350 Ah/kg.

3. The anode of claim 1, wherein the average diameter of the plurality of pores is from about 1 to 10 nm.

4. The anode of claim 1, wherein the self-supporting porous metal substrate has a pore size distribution having a peak ranging from about 0.5 to 4 µm pore diameter and multiple peaks ranging from about 0.1 to 20 nm.

5. The anode of claim 1, wherein the self-supporting porous metal substrate is prepared by sintering a plurality of copper nanoparticles and/or a copper metal precursor to form the self-supporting porous metal substrate.

6. The anode of claim 1, wherein the self-supporting porous metal substrate is prepared by providing a copper-containing alloy and chemically or electrochemically dealloying the copper-containing alloy to form the self-supporting porous metal substrate.

7. An electrochemical battery comprising:
an electrolyte;
a cathode;
a current collector in communication with an external face of the cathode;
an anode consisting of a self-supporting porous metal substrate;
a separator positioned between the cathode and the anode, and
wherein the self-supporting porous metal substrate is electrically conductive and consists of copper having a plurality of pores capable of ion insertion and extraction, the plurality of pores having an average diameter ranging from about 0.1 to 40 nm, and wherein the anode acts as the anode and a current collector in the electrochemical battery.

8. The electrochemical battery of claim 7, wherein the anode has a specific capacity in the electrochemical battery that is greater than about 350 Ah/kg.

9. The electrochemical battery of claim 7, wherein an average diameter of the plurality of pores is from about 1 to 10 nm.

10. An electrochemical battery comprising:
an electrolyte;
a cathode;
a current collector in communication with an external face of the cathode;
an anode consisting of a self-supporting porous metal substrate;
a separator positioned between the cathode and the anode,
wherein the self-supporting porous metal substrate is electrically conductive and consists of copper having a plurality of pores capable of ion insertion and extraction, and
wherein the anode acts as anode and a current collector in the electrochemical battery.

11. The electrochemical battery of claim 7, wherein the self-supporting porous metal substrate has a pore size distribution having a peak ranging from about 0.5 to 4 µm pore diameter and multiple peaks ranging from about 0.1 to 20 nm.

12. The electrochemical battery of claim 7, wherein the self-supporting porous metal substrate is prepared by sintering a plurality of copper nanoparticles and/or a copper metal precursor to form the self-supporting porous metal substrate.

13. The electrochemical battery of claim 7, wherein the self-supporting porous metal substrate is prepared by providing a copper-containing alloy and chemically or electrochemically dealloying the copper-containing alloy to form the self-supporting porous metal substrate.

14. The anode of claim 1, wherein the anode has a specific capacity in the electrochemical battery that is less than about 350 Ah/kg.

15. The electrochemical battery of claim 7, wherein the anode has a specific capacity in the electrochemical battery that is less than about 350 Ah/kg.

16. The anode of claim 1, wherein the self-supporting porous metal substrate has a volume of the plurality of pores in a range of about 0.00001 to 0.01 $cm^3/g$.

17. The electrochemical battery of claim 7, wherein the self-supporting porous metal substrate has a volume of the plurality of pores in a range of about 0.00001 to 0.01 $cm^3/g$.

18. The electrochemical battery of claim 10, wherein the self-supporting porous metal substrate has a volume of the plurality of pores in a range of about 0.00001 to 0.01 $cm^3/g$.

* * * * *